US012757137B2

(12) United States Patent
Yuan et al.

(10) Patent No.: US 12,757,137 B2
(45) Date of Patent: Oct. 6, 2026

(54) SYNCHRONIZATION SIGNAL BLOCKS FROM NON-SERVING CELLS

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/292,674

(22) PCT Filed: Sep. 8, 2021

(86) PCT No.: PCT/CN2021/117095
§ 371 (c)(1),
(2) Date: Jan. 26, 2024

(87) PCT Pub. No.: WO2023/035131
PCT Pub. Date: Mar. 16, 2023

(65) Prior Publication Data

US 2025/0088986 A1 Mar. 13, 2025

(51) Int. Cl.
*H04W 56/00* (2009.01)
*H04L 5/00* (2006.01)

(52) U.S. Cl.
CPC ....... *H04W 56/0015* (2013.01); *H04L 5/0053* (2013.01)

(58) Field of Classification Search
CPC ... H04L 1/1819; H04L 1/1861; H04L 5/0053; H04L 5/0094; H04L 5/0073;
(Continued)

(56) References Cited

U.S. PATENT DOCUMENTS 11,558,833 B2 * 1/2023 Wang .................. H04W 56/001
12,047,784 B2 * 7/2024 Harada ................. H04L 5/0044
(Continued)

FOREIGN PATENT DOCUMENTS

CN 110167134 A 8/2019
WO 2020263946 12/2020

OTHER PUBLICATIONS

3GPP Technical Specification Group Radio Access Network, Physical Layer Procedures for data (Release 15), 3GPP TS 38.214, V1.1.0, Oct. 31, 2017 (Oct. 31, 2017), 36 Pages, The Whole Document.
(Continued)

*Primary Examiner* — Frank Duong
(74) *Attorney, Agent, or Firm* — QUALCOMM Incorporated

(57) ABSTRACT

Various aspects of the present disclosure generally relate to wireless communication. In some aspects, a user equipment (UE) may receive a first allocation, for reception of a downlink communication via a first cell, that is configured to be spaced by an amount of time from a second allocation for reception of a synchronization signal block (SSB) for a second cell. The UE may receive the downlink communication using resources of the first allocation and receiving the SSB using resources of the second allocation. Numerous other aspects are described.

30 Claims, 16 Drawing Sheets

(58) Field of Classification Search
CPC ............... H04W 48/12; H04W 56/001; H04W 56/0015; H04W 72/0446; H04W 72/21; H04W 72/231; H04W 72/53
See application file for complete search history.

(56) References Cited

U.S. PATENT DOCUMENTS

| | | | | |
|---|---|---|---|---|
| 12,335,194 | B2 * | 6/2025 | Zhang | H04L 5/0044 |
| 2019/0261252 | A1 * | 8/2019 | Wilson | H04W 72/0446 |
| 2020/0154449 | A1 * | 5/2020 | Akkarakaran | H04W 72/56 |
| 2021/0243703 | A1 | 8/2021 | Wolf et al. | |
| 2021/0258065 | A1 * | 8/2021 | Wang | H04B 7/06964 |
| 2021/0328710 | A1 * | 10/2021 | Zhou | H04W 28/04 |
| 2022/0007342 | A1 * | 1/2022 | Khoshnevisan | H04L 5/0094 |
| 2022/0322252 | A1 * | 10/2022 | Chen | H04W 72/0446 |
| 2022/0322372 | A1 * | 10/2022 | Takeda | H04J 11/005 |
| 2022/0322381 | A1 * | 10/2022 | Zhang | H04W 72/23 |
| 2022/0369250 | A1 * | 11/2022 | Khoshnevisan | H04W 56/001 |
| 2023/0132666 | A1 * | 5/2023 | Zhang | H04L 5/0044 370/329 |
| 2023/0224891 | A1 * | 7/2023 | Noh | H04L 5/005 370/329 |
| 2025/0063562 | A1 * | 2/2025 | Zhang | H04L 5/0094 |

OTHER PUBLICATIONS

International Search Report and Written Opinion—PCT/CN2021/117095—ISA/EPO—Apr. 25, 2022.

* cited by examiner

SYNCHRONIZATION SIGNAL BLOCKS FROM NON-SERVING CELLS

CROSS-REFERENCE TO RELATED APPLICATION

This application is a 371 national stage of Patent Cooperation Treaty (PCT) Application No. PCT/CN2021/117095 filed on Sep. 8, 2021, entitled "SYNCHRONIZATION SIGNAL BLOCKS FROM NON-SERVING CELLS," which is hereby expressly incorporated by reference herein.

FIELD OF THE DISCLOSURE

Aspects of the present disclosure generally relate to wireless communication and to techniques and apparatuses for receiving synchronization signal blocks from non-serving cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first allocation, for reception of a downlink communication via a first cell, that is configured to be spaced by an amount of time from a second allocation for reception of a synchronization signal block (SSB) for a second cell. The method may include receiving the downlink communication using resources of the first allocation and receiving the SSB using resources of the second allocation.

Some aspects described herein relate to a method of wireless communication performed by a UE. The method may include receiving a first allocation, for reception of a downlink communication via a first cell, that overlaps with a second allocation for reception of a SSB for a second cell. The method may include receiving the downlink communication during non-overlapping resources and receiving the SSB during overlapping resources.

Some aspects described herein relate to a method of wireless communication performed by a UE. The method may include transmitting an indication of a capability to receive one or more SSBs, from one or more non-serving cells, on resources that overlap with a downlink communication from a serving cell. The method may include receiving, based at least in part on the indication, a first allocation for reception of the downlink communication from the serving cell that overlaps with a second allocation for reception of an SSB for a non-serving cell.

Some aspects described herein relate to a method of wireless communication performed by a base station. The method may include transmitting, to a UE, a first allocation, for reception of a downlink communication via a first cell associated with the base station, that is configured to be spaced by an amount of time from a second allocation for reception of a SSB for a second cell. The method may include transmitting the downlink communication using resources of the first allocation and transmitting the SSB using resources of the second allocation.

Some aspects described herein relate to a method of wireless communication performed by a base station. The method may include transmitting, to a UE, a first allocation, for reception of a downlink communication via a first cell associated with the base station, that overlaps with a second allocation for reception of a SSB for a second cell. The method may include transmitting the downlink communication during non-overlapping resources.

Some aspects described herein relate to a method of wireless communication performed by a base station. The method may include receiving, from a UE, an indication of a capability to receive one or more SSBs, from one or more non-serving cells, on resources that overlap with a downlink communication from a serving cell. The method may include transmitting, based at least in part on the indication, a first allocation for reception of the downlink communication from the serving cell that overlaps with a second allocation for reception of an SSB for a non-serving cell.

Some aspects described herein relate to a UE for wireless communication. The user equipment may include a memory and one or more processors coupled to the memory. The one or more processors may be configured to receive a first allocation, for reception of a downlink communication via a first cell, that is configured to be spaced by an amount of time from a second allocation for reception of a SSB for a second cell. The one or more processors may be configured to receive the downlink communication using resources of the first allocation and receiving the SSB using resources of the second allocation.

Some aspects described herein relate to a UE for wireless communication. The UE may include a memory and one or more processors coupled to the memory. The one or more processors may be configured to receive a first allocation, for reception of a downlink communication via a first cell, that overlaps with a second allocation for reception of a SSB for a second cell. The one or more processors may be configured to receive the downlink communication during non-overlapping resources and receiving the SSB during overlapping resources.

Some aspects described herein relate to a UE for wireless communication. The UE may include a memory and one or more processors coupled to the memory. The one or more processors may be configured to transmit an indication of a capability to receive one or more SSBs, from one or more non-serving cells, on resources that overlap with a downlink communication from a serving cell. The one or more processors may be configured to receive, based at least in part on the indication, a first allocation for reception of the downlink communication from the serving cell that overlaps with a second allocation for reception of an SSB for a non-serving cell.

Some aspects described herein relate to a base station for wireless communication. The base station may include a memory and one or more processors coupled to the memory. The one or more processors may be configured to transmit, to a UE, a first allocation, for reception of a downlink communication via a first cell associated with the base station, that is configured to be spaced by an amount of time from a second allocation for reception of a SSB for a second cell. The one or more processors may be configured to transmit the downlink communication using resources of the first allocation and transmitting the SSB using resources of the second allocation.

Some aspects described herein relate to a base station for wireless communication. The base station may include a memory and one or more processors coupled to the memory. The one or more processors may be configured to transmit, to a UE, a first allocation, for reception of a downlink communication via a first cell associated with the base station, that overlaps with a second allocation for reception of a SSB for a second cell. The one or more processors may be configured to transmit the downlink communication during non-overlapping resources.

Some aspects described herein relate to a base station for wireless communication. The base station may include a memory and one or more processors coupled to the memory. The one or more processors may be configured to receive, from a UE, an indication of a capability to receive one or more SSBs, from one or more non-serving cells, on resources that overlap with a downlink communication from a serving cell. The one or more processors may be configured to transmit, based at least in part on the indication, a first allocation for reception of the downlink communication from the serving cell that overlaps with a second allocation for reception of an SSB for a non-serving cell.

Some aspects described herein relate to a non-transitory computer-readable medium that stores a set of instructions for wireless communication by a UE. The set of instructions, when executed by one or more processors of the UE, may cause the UE to receive a first allocation, for reception of a downlink communication via a first cell, that is configured to be spaced by an amount of time from a second allocation for reception of a SSB for a second cell. The set of instructions, when executed by one or more processors of the UE, may cause the UE to receive the downlink communication using resources of the first allocation and receiving the SSB using resources of the second allocation.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to receive a first allocation, for reception of a downlink communication via a first cell, that overlaps with a second allocation for reception of a SSB for a second cell. The set of instructions, when executed by one or more processors of the one or more instructions that, when executed by one or more processors of a UE, may cause the one or more instructions that, when executed by one or more processors of a UE to receive the downlink communication during non-overlapping resources and receiving the SSB during overlapping resources.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to transmit an indication of a capability to receive one or more SSBs, from one or more non-serving cells, on resources that overlap with a downlink communication from a serving cell. The set of instructions, when executed by one or more processors of the one or more instructions that, when executed by one or more processors of a UE, may cause the one or more instructions that, when executed by one or more processors of a UE to receive, based at least in part on the indication, a first allocation for reception of the downlink communication from the serving cell that overlaps with a second allocation for reception of an SSB for a non-serving cell.

Some aspects described herein relate to a non-transitory computer-readable medium that stores a set of instructions for wireless communication by a base station. The set of instructions, when executed by one or more processors of the base station, may cause the base station to transmit, to a UE, a first allocation, for reception of a downlink communication via a first cell associated with the base station, that is configured to be spaced by an amount of time from a second allocation for reception of a SSB for a second cell. The set of instructions, when executed by one or more processors of the base station, may cause the base station to transmit the downlink communication using resources of the first allocation and transmitting the SSB using resources of the second allocation.

Some aspects described herein relate to a non-transitory computer-readable medium that stores a set of instructions for wireless communication by a base station. The set of instructions, when executed by one or more processors of the base station, may cause the base station to transmit, to a UE, a first allocation, for reception of a downlink communication via a first cell associated with the base station, that overlaps with a second allocation for reception of a SSB for a second cell. The set of instructions, when executed by one or more processors of the base station, may cause the base station to transmit the downlink communication during non-overlapping resources.

Some aspects described herein relate to a non-transitory computer-readable medium that stores a set of instructions for wireless communication by a base station. The set of instructions, when executed by one or more processors of the base station, may cause the base station to receive, from a UE, an indication of a capability to receive one or more SSBs, from one or more non-serving cells, on resources that overlap with a downlink communication from a serving cell. The set of instructions, when executed by one or more processors of the base station, may cause the base station to transmit, based at least in part on the indication, a first allocation for reception of the downlink communication from the serving cell that overlaps with a second allocation for reception of an SSB for a non-serving cell.

Some aspects described herein relate to an apparatus for wireless communication. The apparatus may include means for receiving a first allocation, for reception of a downlink communication via a first cell, that is configured to be spaced by an amount of time from a second allocation for reception of a SSB for a second cell. The apparatus may include means for receiving the downlink communication using resources of the first allocation and receiving the SSB using resources of the second allocation.

Some aspects described herein relate to an apparatus for wireless communication. The apparatus may include means for receiving a first allocation, for reception of a downlink communication via a first cell, that overlaps with a second allocation for reception of a SSB for a second cell. The apparatus may include means for receiving the downlink communication during non-overlapping resources and receiving the SSB during overlapping resources.

Some aspects described herein relate to an apparatus for wireless communication. The apparatus may include means for transmitting an indication of a capability to receive one or more SSBs, from one or more non-serving cells, on resources that overlap with a downlink communication from a serving cell. The apparatus may include means for receiving, based at least in part on the indication, a first allocation for reception of the downlink communication from the serving cell that overlaps with a second allocation for reception of an SSB for a non-serving cell.

Some aspects described herein relate to an apparatus for wireless communication. The apparatus may include means for transmitting, to a UE, a first allocation, for reception of a downlink communication via a first cell associated with the apparatus, that is configured to be spaced by an amount of time from a second allocation for reception of a SSB for a second cell. The apparatus may include means for transmitting the downlink communication using resources of the first allocation and transmitting the SSB using resources of the second allocation.

Some aspects described herein relate to an apparatus for wireless communication. The apparatus may include means for transmitting, to a UE, a first allocation, for reception of a downlink communication via a first cell associated with the apparatus, that overlaps with a second allocation for reception of a SSB for a second cell. The apparatus may include means for transmitting the downlink communication during non-overlapping resources.

Some aspects described herein relate to an apparatus for wireless communication. The apparatus may include means for receiving, from a UE, an indication of a capability to receive one or more SSBs, from one or more non-serving cells, on resources that overlap with a downlink communication from a serving cell. The apparatus may include means for transmitting, based at least in part on the indication, a first allocation for reception of the downlink communication from the serving cell that overlaps with a second allocation for reception of an SSB for a non-serving cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying Figs. Each of the Figs. is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
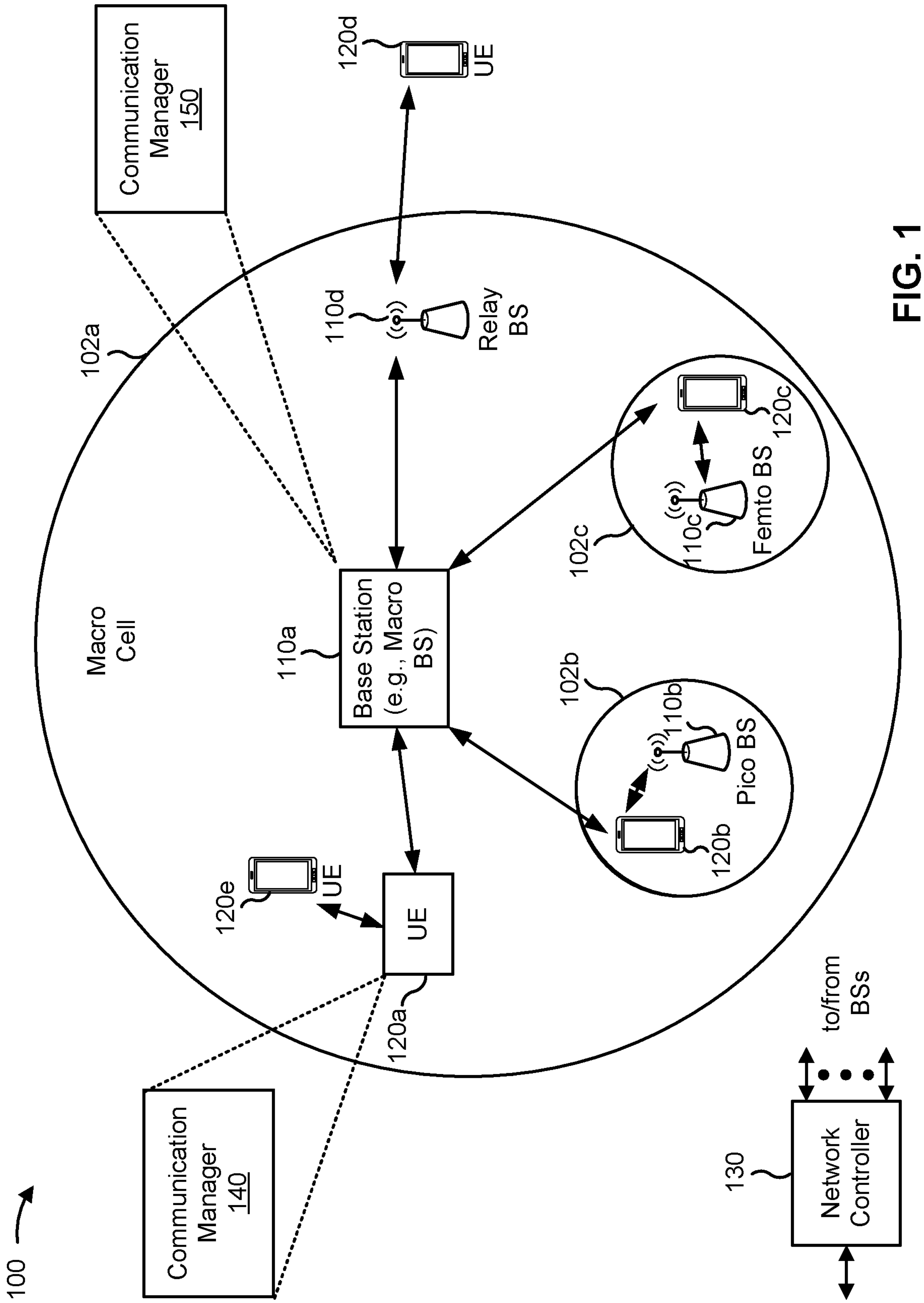
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first allocation, for reception of a downlink communication via a first cell, that is configured to be spaced by an amount of time from a second allocation for reception of a SSB for a second cell; and receive the downlink communication using resources of the first allocation and receiving the SSB using resources of the second allocation. Additionally, or alternatively, the communication manager 140 may perform one or more other operations described herein.

In some aspects, the UE 120 may include a communication manager 140. As described in more detail elsewhere herein, the communication manager 140 may receive a first allocation, for reception of a downlink communication via a first cell, that overlaps with a second allocation for reception of a SSB for a second cell; and receive the downlink communication during non-overlapping resources and receiving the SSB during overlapping resources. Additionally, or alternatively, the communication manager 140 may perform one or more other operations described herein.

In some aspects, the UE 120 may include a communication manager 140. As described in more detail elsewhere herein, the communication manager 140 may transmit an indication of a capability to receive one or more SSBs, from one or more non-serving cells, on resources that overlap with a downlink communication from a serving cell; and receive, based at least in part on the indication, a first allocation for reception of the downlink communication from the serving cell that overlaps with a second allocation for reception of an SSB for a non-serving cell. Additionally, or alternatively, the communication manager 140 may perform one or more other operations described herein.

In some aspects, the base station 110 may include a communication manager 150. As described in more detail elsewhere herein, the communication manager 150 may transmit, to a UE, a first allocation, for reception of a downlink communication via a first cell associated with the base station, that is configured to be spaced by an amount of time from a second allocation for reception of a SSB for a second cell; and transmit the downlink communication using resources of the first allocation and transmitting the SSB using resources of the second allocation. Additionally, or alternatively, the communication manager 150 may perform one or more other operations described herein.

In some aspects, the base station 110 may include a communication manager 150. As described in more detail elsewhere herein, the communication manager 150 may transmit, to a UE, a first allocation, for reception of a downlink communication via a first cell associated with the base station, that overlaps with a second allocation for reception of a SSB for a second cell; and transmit the downlink communication during non-overlapping resources. Additionally, or alternatively, the communication manager 150 may perform one or more other operations described herein.

In some aspects, the base station 110 may include a communication manager 150. As described in more detail elsewhere herein, the communication manager 150 may receive, from a UE, an indication of a capability to receive one or more SSBs, from one or more non-serving cells, on resources that overlap with a downlink communication from a serving cell; and transmit, based at least in part on the indication, a first allocation for reception of the downlink communication from the serving cell that overlaps with a second allocation for reception of an SSB for a non-serving cell. Additionally, or alternatively, the communication manager 150 may perform one or more other operations described herein.

As indicated above, FIG. 1 is provided as an example. Other examples may differ from what is described with regard to FIG. 1.

Figure 2:
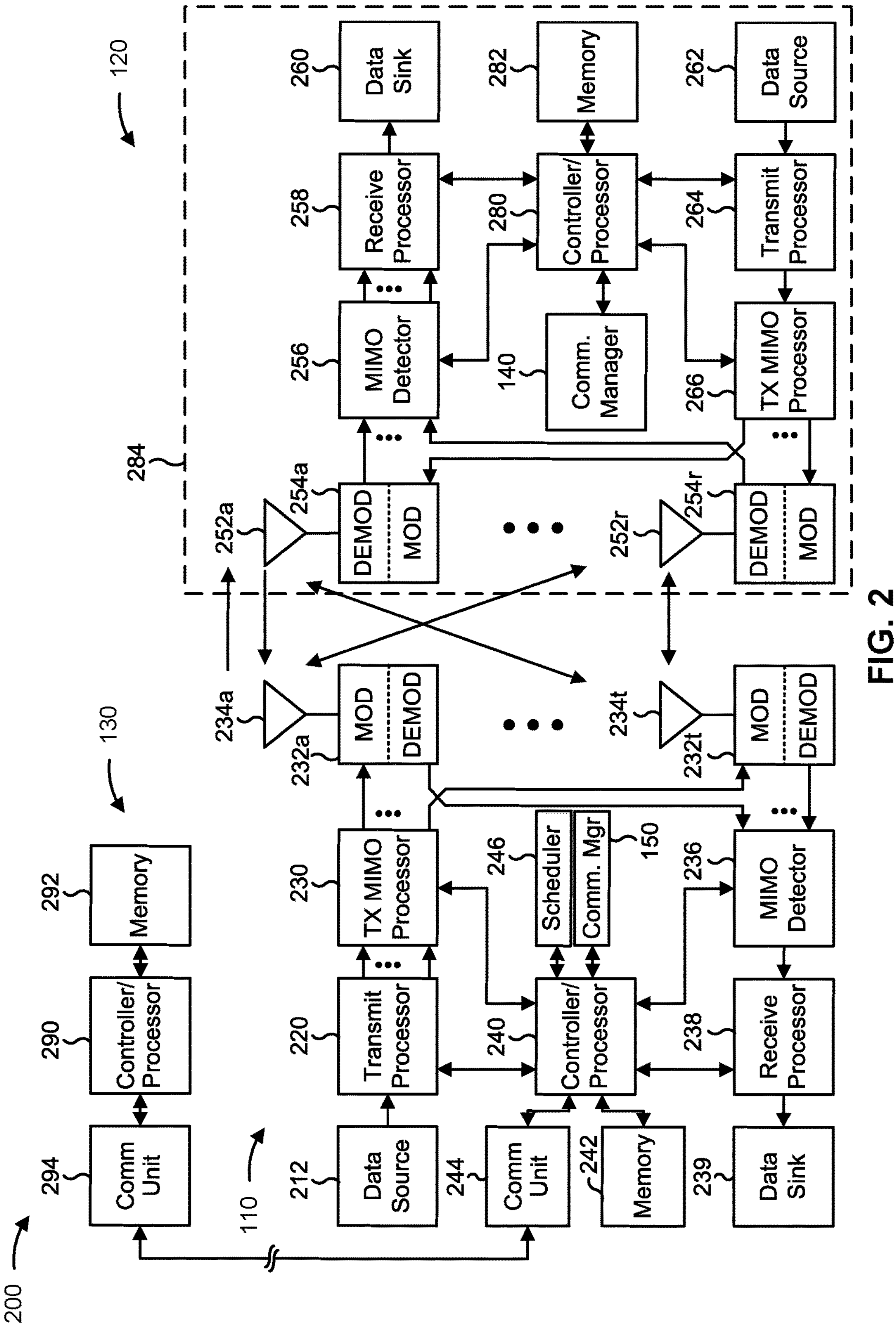
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-15).

The controller/processor 240 of the base station 110, the controller/processor 280 of the UE 120, and/or any other component(s) of FIG. 2 may perform one or more techniques associated with receiving SSBs from non-serving cells, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE includes means for receiving a first allocation, for reception of a downlink communication via a first cell, that is configured to be spaced by an amount of time from a second allocation for reception of a SSB for a second cell; and/or means for receiving the downlink communication using resources of the first allocation and receiving the SSB using resources of the second allocation. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving a first allocation, for reception of a downlink communication via a first cell, that overlaps with a second allocation for reception of a SSB for a second cell; and/or means for receiving the downlink communication during non-overlapping resources and receiving the SSB during overlapping resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for transmitting an indication of a capability to receive one or more SSBs, from one or more non-serving cells, on resources that overlap with a downlink communication from a serving cell; and/or means for receiving, based at least in part on the indication, a first allocation for reception of the downlink communication from the serving cell that overlaps with a second allocation for reception of an SSB for a non-serving cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a first allocation, for reception of a downlink communication via a first cell associated with the base station, that is configured to be spaced by an amount of time from a second allocation for reception of a SSB for a second cell; and/or means for transmitting the downlink communication using resources of the first allocation and transmitting the SSB using resources of the second allocation. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for transmitting, to a UE, a first allocation, for reception of a downlink communication via a first cell associated with the base station, that overlaps with a second allocation for reception of a SSB for a second cell; and/or means for transmitting the downlink communication during non-overlapping resources. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station includes means for receiving, from a UE, an indication of a capability to receive one or more SSBs, from one or more non-serving cells, on resources that overlap with a downlink communication from a serving cell; and/or means for transmitting, based at least in part on the indication, a first allocation for reception of the downlink communication from the serving cell that overlaps with a second allocation for reception of an SSB for a non-serving cell. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
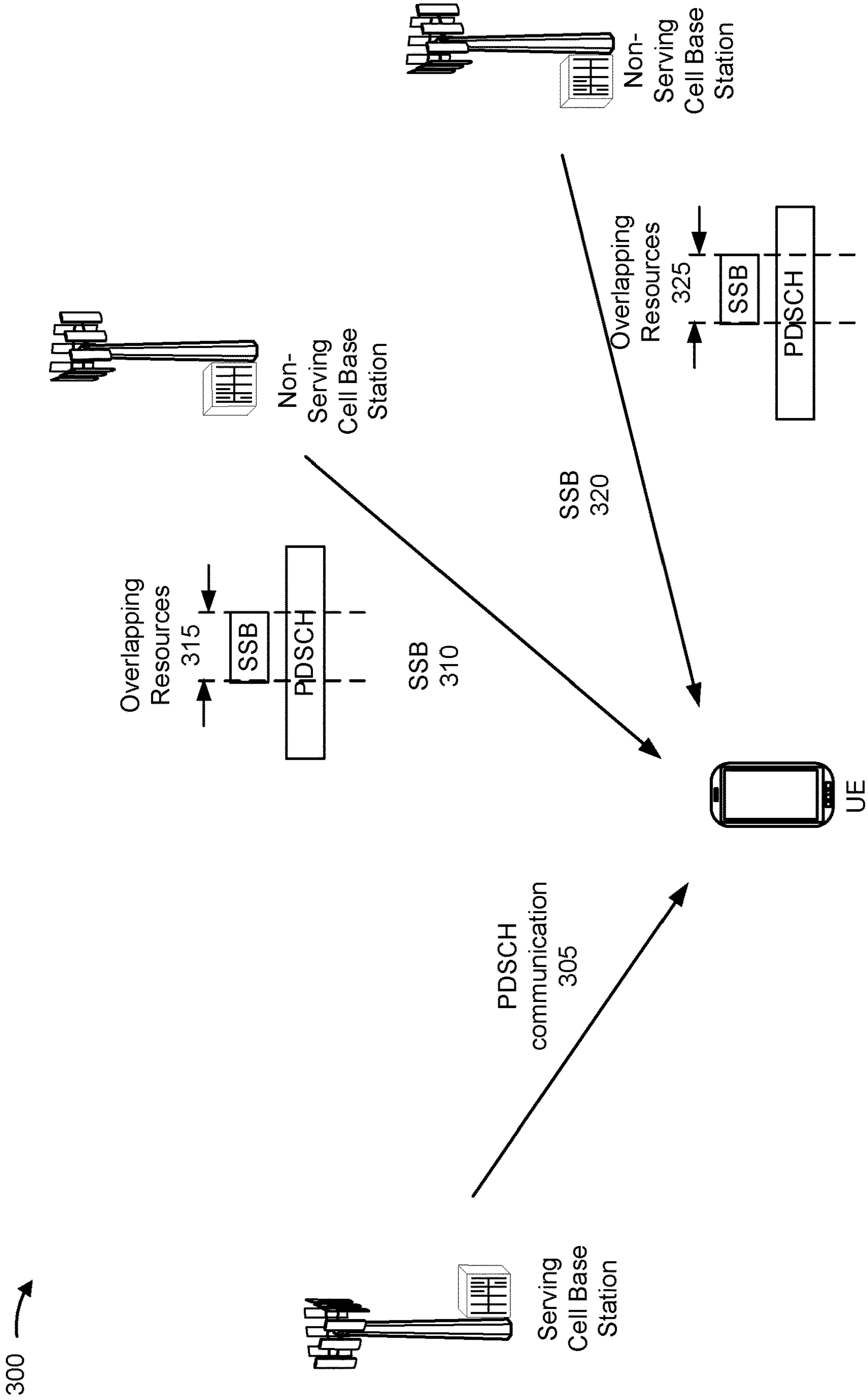
FIG. 3 is a diagram illustrating an example of attempting to receive SSBs from non-serving cells in accordance with the present disclosure.

FIG. 3 is a diagram illustrating an example 300 of attempting to receive SSBs from non-serving cells, in accordance with the present disclosure. As shown in FIG. 3, a UE (e.g., UE 120) may communicate with a serving cell base station (e.g., base station 110) and one or more non-serving cell base stations (e.g., base stations 110) (collectively referred to as the "base stations"). In some aspects, the base stations and the UE may be part of one or more wireless networks (e.g., wireless network 100). The UE and the serving cell base station may have established a wireless connection prior to operations shown in FIG. 3.

As shown in FIG. 3, the UE may communicate with (e.g., transmit signaling to or receive signaling from) the base stations using different beams of the UE (e.g., associated with different transmission configuration indicator (TCI) states). Links between the UE and the base stations may have different timing advances. For example, a link between the serving cell base station and the UE may have a timing advance that is relatively small based at least in part on a propagation time of a beam path between the serving cell base station and the UE. A link between the non-serving cell base station and the UE may have a timing advance that is larger than the timing advance based at least in part on a propagation time of a beam path between a non-serving cell base station and the UE.

A timing advance indicates an amount of time by which the UE is to transmit an uplink signal to a base station before a time that the UE would have configured for reception of a downlink signal if a downlink signal were scheduled at the same time. For example, the UE determines a timing of beginnings of radio access network (RAN)-based timing units (e.g., slots or symbols) based at least in part on timing of reception of downlink signals. The UE determines, or receives an indication of, an amount of time (the timing advance) by which an uplink transmission is to be transmitted in advance of beginnings of the RAN-based timing units that are based at least in part on reception of downlink signals.

In some networks, a UE may monitor SSBs from non-serving cells to identify mobility metrics (e.g., to determine that a handover may improve a connection to a wireless network), to identify multi-TRP opportunities, to perform beam management via the non-serving cells, and/or to obtain timing information from the non-serving cells. However, the UE may be configured to measure SSBs for non-serving cells with different reception timings. For example, the SSBs for non-serving cells may overlap with a physical downlink shared channel (PDSCH) communication 305 associated with a serving cell (e.g., provided by the serving cell base station).

A non-serving cell base station may transmit an SSB 310 for reception by the UE with the SSB 310 overlapping with the PDSCH communication 305, as shown by the overlapping resources 315. An additional non-serving cell base station may transmit an SSB 320 for reception by the UE with the SSB 320 overlapping with the PDSCH communication 305, as shown by the overlapping resources 325. The UE may fail to receive the SSB 310 and the SSB 320 based at least in part on prioritizing the PDSCH communication 305, or the UE may fail to receive a portion of the PDSCH communication 305 based at least in part on prioritizing the SSB 310 and/or the SSB 320. In some examples, based at least in part on failing to receive the portion of the PDSCH communication 305, the UE may average reception signals received on non-overlapping resources with the overlapping resources 315, which may cause the UE to fail to receive the PDSCH communication. The UE and the serving cell base station may consume network, power, communication, and/or computing resources to detect the failure and/or to re-transmit and/or attempt to receive the PDSCH communication.

In some aspects described herein, a UE may rate match a PDSCH associated with a first cell (e.g., a serving cell and/or a cell associated with a first physical cell identification (PCI)) around one or more SSBs associated with a second cell (e.g., a non-serving cell and/or a cell associated with a second PCI) when the SSB is configured for layer 1 measurements and/or reports by the UE. For example, the UE may expect not to receive portions of a PDSCH associated with the first cell on resources that overlap with an SSB for the second cell. In some aspects, the UE may expect not to receive portions of a PDSCH associated with the first cell on resources that are within a guard window that includes or extends from resources for the SSB for the second cell. The guard window may account for different reception timings between the first cell and the second cell. The reception timing may be larger than one cyclic prefix and/or may be unknown before layer 1 measurement of the SSB.

In another example, the UE may rate match a scheduled PDSCH communication associated with the first cell around the SSB associated with the second cell and/or around the guard window that is X symbols before and Y symbols after the SSB. In some aspects, X and Y may be preconfigured or fixed for different subcarrier spacings. For example, X and Y may be preconfigured such that X=Y=1, or X and Y may be subcarrier spacing-dependent, (e.g., different value for 120 kHz, 240 kHz, 480 kHz, 960 kHz).

In some aspects, the SSB from the second cell may be restricted to an SSB measurement timing configuration (SMTC) window or may not be restricted to the SMTC window.

In some aspects, the UE may indicate that the UE is capable to measure overlapped SSBs of different PCIs. The UE may report the number of SSBs of different PCIs that can be measured simultaneously. The base station may configure the UE for layer 1 measurements on simultaneous SSBs of different PCIs based at least in part on the UE capability.

In some aspects, the UE may be configured to receive SSBs of different PCIs that can be received within a reception timing difference less than a cyclic prefix of the serving cell. In some aspects, the UE may be configured to receive SSBs of different PCIs that can be received within a reception timing difference larger than a cyclic prefix of the serving cell. In some aspects, the UE may be configured to receive SSBs of different PCIs that can be received within time window of X symbols before and/or Y symbols after the serving cell cyclic prefix of the serving cell.

In rate matching to the PDSCH communication, UE may consider to rate match around the union of multiple time windows for simultaneous SSBs of different PCIs. For example, the UE may, during decoding and/or demodulating the PDSCH communication, discard samplings obtained during the union of the multiple time windows and may decode and/or demodulate the PDSCH communication based at least in part on samplings of the PDSCH outside of the union of the multiple time windows.

Based at least in part on the UE receiving the PDSCH communication outside of overlapping resources and/or the guard window, or based at least in part on the UE rate matching the PDSCH communication using non-overlapping resources, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

Figure 4:
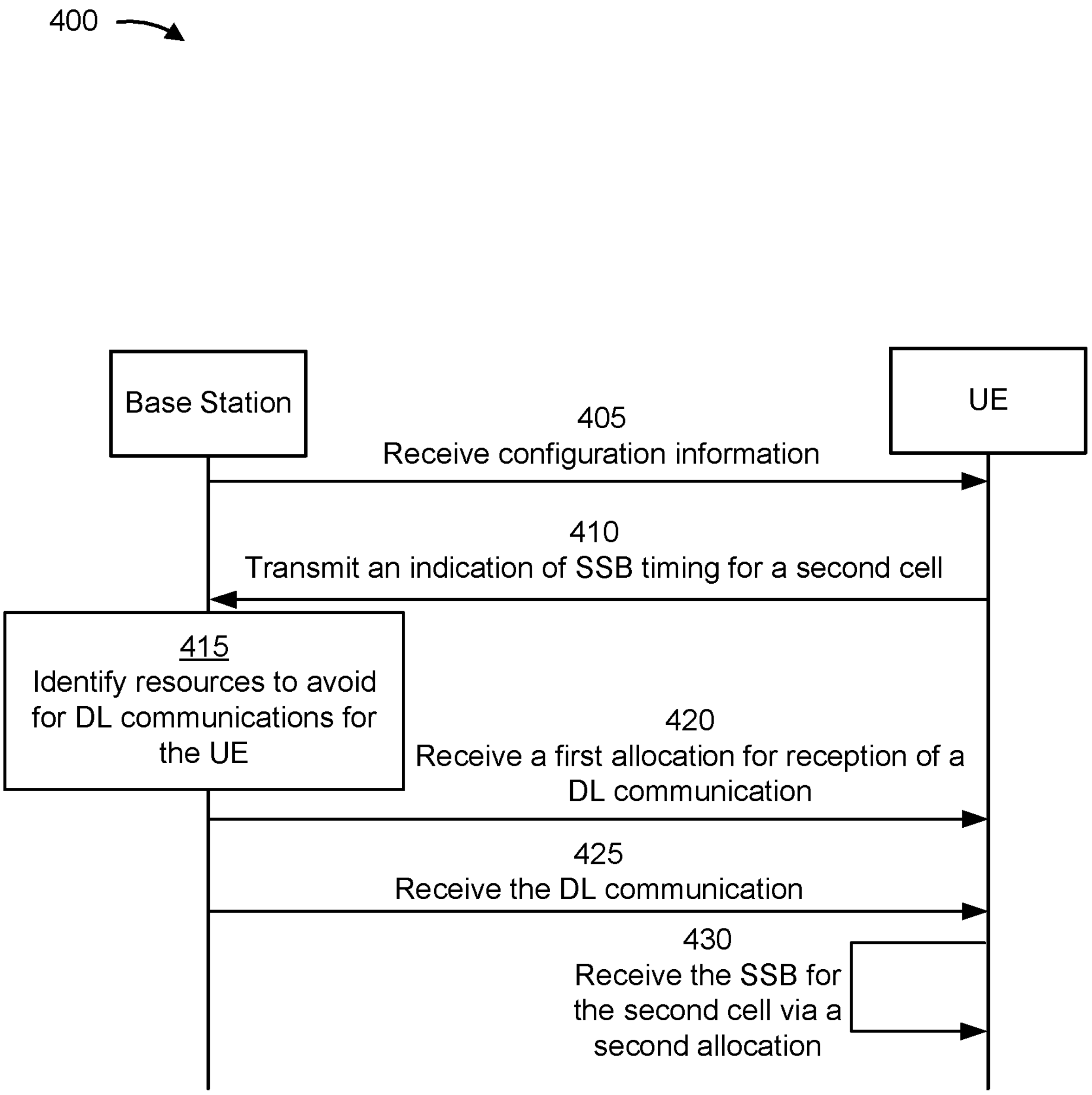
FIGS. 4-7C are diagrams illustrating examples associated with receiving SSBs from non-serving cells, in accordance with the present disclosure.

FIG. 4 is a diagram illustrating an example 400 associated with user equipment support for tracking timing of non-serving cells, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4. The base station and the UE may be associated with a first cell (e.g., a serving cell).

In a first operation shown by reference number 405, the base station may transmit, and the UE may receive, configuration information. In some aspects, the UE may receive the configuration information via one or more of radio resource control (RRC) signaling, medium access control (MAC) control elements (MAC CEs), or downlink control information (DCI), among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to expect not to receive a PDSCH communication on resources that overlap an SSB of a non-serving cell (e.g., to assume that the PDSCH communication is not transmitted on the resources that overlap the SSB of the non-serving cell). In some aspects, the configuration information may indicate that the UE is to transmit an indication of one or more non-serving cells that the UE is to monitor for SSBs.

The UE may configure itself based at least in part on the configuration information. In some aspects, the UE may be configured to perform one or more operations described herein based at least in part on the configuration information.

As shown by reference number 410, the UE may transmit, and the base station may receive, an indication of SSB timing for a second cell (e.g., a non-serving cell). In some aspects, the UE transmits the timing for the second cell based at least in part on a previously received communication via the second cell. In some aspects, the UE may be unaware of the timing for the second cell. In some aspects, the UE may transmit an indication of a PCI of the second cell, and the base station may estimate the timing for the second cell based at least in part on the PCI of the second cell. In some aspects, transmission of the indication of the SSB timing is optional and/or may be omitted.

As shown by reference number 415, the base station may identify resources to avoid for downlink communications for the UE. For example, the base station may identify resources that overlap with an allocation of resources for reception of the SSB of the second cell. The base station may further identify resources to avoid that are within an amount of time (e.g., in RAN timing units, such as symbols, or slots) from the allocation of resources for reception of the SSB of the second cell. In some aspects, the amount of time may be based at least in part on a communication protocol and/or based at least in part on the configuration information described in connection with reference number 405 or other configuration information. In some aspects, the amount of time may be based at least in part on subcarrier spacing of a downlink communication and/or a subcarrier spacing associated with the first cell.

As shown by reference number 420, the UE may receive, and the base station may transmit, an indication of a first allocation for reception of a downlink communication. For example, the UE may receive the first allocation that is configured to be spaced by an amount of time from a second allocation for reception of an SSB for the second cell.

In some aspects, the second allocation for reception of the SSB may be associated with a guard window that extends for a first number of symbols before a scheduled or configured transmission of the SSB and for a second number of symbols after the scheduled or configured transmission of the SSB. The guard window may be configured as a timing window during which the base station is configured not to transmit the downlink communication from the first cell. In some aspects, the first number of symbols and/or the second number of symbols may be based at least in part on a difference in reception timings, at the UE, associated with the first cell and the second cell. For example, the base station may estimate a length of the guard window based at least in part on a location of the UE (e.g., relative to a base station of the second cell) and/or based at least in part on a configured length of the guard window. In some aspects, the difference in the reception timings at the UE is unknown (e.g., by the UE and/or the base station) before reception of the SSB. Thus, the length of the guard window may cover the maximum reception timings between the first cell and the second cell.

As shown by reference number 425, the UE may receive the downlink communication using resources of the first allocation. As shown by reference number 430, the UE may receive the SSB using resources of the second allocation. In some aspects, the resources of the first allocation may include resources that are before the resources of the second allocation and/or may include resources that are after the resources of the second allocation.

Based at least in part on the UE receiving the PDSCH communication outside of overlapping resources and/or the guard window, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

As indicated above, FIG. 4 is provided as an example. Other examples may differ from what is described with regard to FIG. 4.

Figure 5:
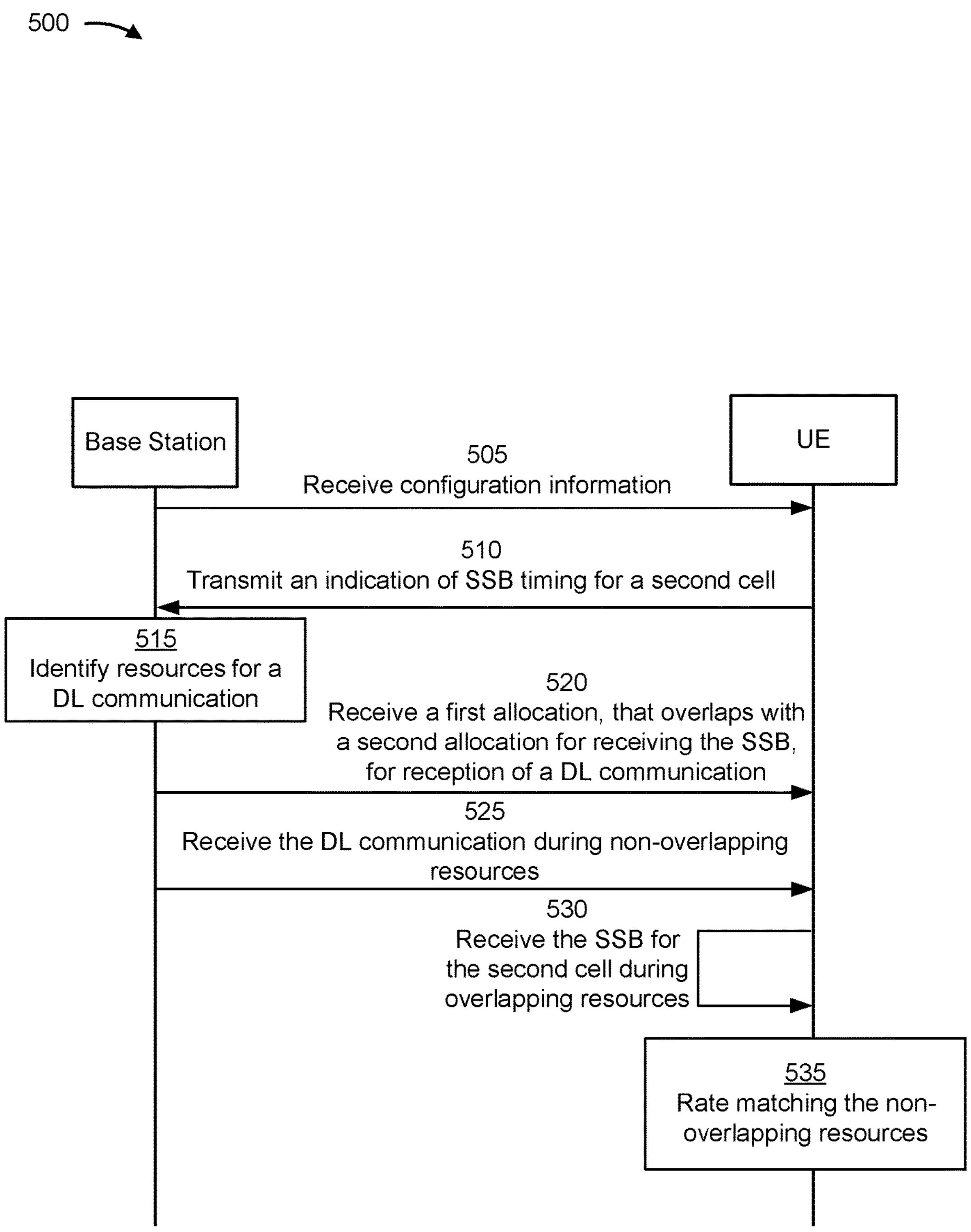

FIG. 5 is a diagram illustrating an example 500 associated with user equipment support for tracking timing of non-serving cells, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5. The base station and the UE may be associated with a first cell (e.g., a serving cell).

In a first operation shown by reference number 505, the base station may transmit, and the UE may receive, configuration information. In some aspects, the UE may receive the configuration information via one or more of RRC signaling, MAC CEs, or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to receive a PDSCH communication on resources that do not overlap an SSB of a non-serving cell and to receive the SSB of the non-serving cell on resources that overlap with the SSB. In some aspects, the configuration information may indicate that the UE is to transmit an indication of one or more non-serving cells that the UE is to monitor for SSBs.

The UE may configure itself based at least in part on the configuration information. In some aspects, the UE may be configured to perform one or more operations described herein based at least in part on the configuration information.

As shown by reference number 510, the UE may transmit, and the base station may receive, an indication of SSB reception timing for a second cell (e.g., a non-serving cell). In some aspects, the UE transmits the timing for the second cell based at least in part on a previously received communication via the second cell. In some aspects, the UE may be unaware of the timing for the second cell. In some aspects, the UE may transmit an indication of a PCI of the second cell, and the base station may estimate the timing for the second cell based at least in part on the PCI of the second cell. In some aspects, transmission of the indication of the SSB reception timing is optional and/or may be omitted.

As shown by reference number 515, the base station may identify resources for a downlink communication for the UE. For example, the base station may identify resources that overlap with an allocation of resources for reception of the SSB of the second cell. The base station may determine that the UE is to rate match the downlink communication using resources of the allocation that are not overlapping with the SSB of the second cell. The base station may further determine that the UE is to rate match the downlink communication using resources of the allocation that are not within an amount of time (e.g., in RAN timing units, such as symbols) from the allocation of resources for reception of the SSB of the second cell. In some aspects, the amount of time may be based at least in part on a communication protocol and/or based at least in part on the configuration information described in connection with reference number 505 or other configuration information. In some aspects, the amount of time may be based at least in part on subcarrier spacing of a downlink communication and/or a subcarrier spacing associated with the first cell.

As shown by reference number 520, the UE may receive, and the base station may transmit, an indication of a first allocation for reception of the downlink communication. For example, the UE may receive the first allocation that overlaps with a second allocation for reception of an SSB for a second cell.

In some aspects, the first allocation overlaps with the second allocation and a guard window that extends for a first number of symbols before a scheduled transmission of the SSB and for a second number of symbols after the scheduled transmission of the SSB. The guard window may be configured as a timing window during which the UE is to rate match the downlink communication. In some aspects, the first number of symbols and/or the second number of symbols may be based at least in part on a difference in reception timings, at the UE, associated with the first cell and the second cell. For example, the base station may estimate a length of the guard window based at least in part on a location of the UE (e.g., relative to a base station of the second cell) and/or based at least in part on a configured length of the guard window. In some aspects, the difference in the reception timings at the UE is unknown (e.g., by the UE and/or the base station) before reception of the SSB.

As shown by reference number 525, the UE may receive the downlink communication during non-overlapping resources of the first allocation. As shown by reference number 530, the UE may receive the SSB during overlapping resources of the first allocation. In some aspects, the non-overlapping resources of the first allocation may include resources that are before the overlapping resources and/or may include non-overlapping resources that are after the overlapping resources of the second allocation. In some aspects, the UE may receive the downlink communication during the non-overlapping resources that are outside of the guard window. In some aspects, the UE may receive the SSB during the overlapping resources within an SSB measurement timing configuration window or during the overlapping resources outside of the SSB measurement timing configuration window.

As shown by reference number 535, the UE may rate match the non-overlapping resources. For example, the UE may discard signal samples within the overlapping resources and/or within the guard window for decoding and/or demodulating the downlink communication.

Based at least in part on the UE receiving (e.g., using rate matching) the PDSCH communication using non-overlapping resources, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

As indicated above, FIG. 5 is provided as an example. Other examples may differ from what is described with regard to FIG. 5.

Figure 6:
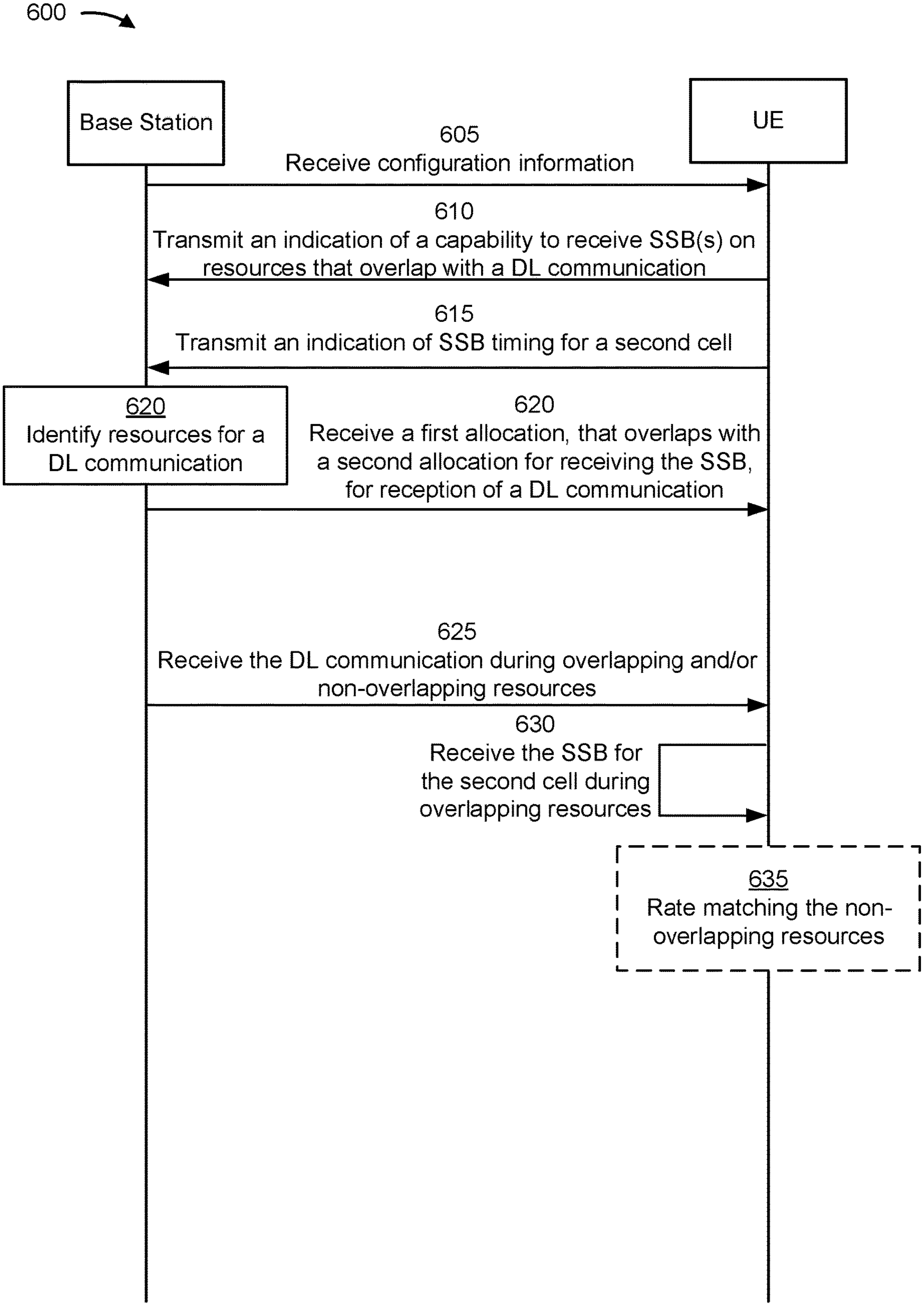

FIG. 6 is a diagram illustrating an example 600 associated with UE support for tracking timing of non-serving cells, in accordance with the present disclosure. As shown in FIG. 6, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 6. The base station and the UE may be associated with a first cell (e.g., a serving cell).

In a first operation shown by reference number 605, the base station may transmit, and the UE may receive, configuration information. In some aspects, the UE may receive the configuration information via one or more of RRC signaling, MAC CEs, or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to transmit an indication of a capability to receive one or more SSBs on resources that overlap with a downlink communication. In some aspects, the configuration information may indicate that the UE is to receive a PDSCH communication on resources that do not overlap an SSB of a non-serving cell and to receive the SSB of the non-serving cell on resources that overlap with the SSB based at least in part on the UE being configured to receive a number of SSBs of non-serving cells that satisfies a threshold. In some aspects, the configuration information may indicate that the UE is to transmit an indication of one or more non-serving cells that the UE is to monitor for SSBs.

The UE may configure itself based at least in part on the configuration information. In some aspects, the UE may be configured to perform one or more operations described herein based at least in part on the configuration information.

As shown by reference number 610, the UE may transmit an indication of a capability to receive one or more SSBs on resources that overlap with a downlink communication. For example, the UE may transmit an indication of a capability to receive the one or more SSBs from one or more non-serving cells on resources that overlap with the downlink communication from the first cell (e.g., the serving cell). In some aspects, the UE may transmit the indication of support via RRC signaling (e.g., as part of an RRC connection process). In some aspects, the UE may transmit the indication of the capability via dynamic signaling (e.g., via uplink control information and/or one or more MAC CEs).

In some aspects, the indication may include an indication of a number of SSBs having different PCIs that the UE is capable of receiving simultaneously on resources that overlap with the downlink communication from the serving cell. The indication of the number of SSBs having different PCIs that the UE is capable to receive simultaneously on resources that overlap with the downlink communication may include an indication of a number of SSBs having different PCIs and having reception timing differences that are less than a cyclic prefix associated with the serving cell, and/or a number of SSBs having different PCIs and having reception timing differences that are greater than a cyclic prefix associated with the serving cell. In some aspects, the indication of the number of SSBs having different PCIs that the UE is capable to receive simultaneously on resources that overlap with the downlink communication may include a number of SSBs having different PCIs and having reception timing differences from a serving cell SSB that are less than a reception timing difference threshold.

In some aspects, the capability to receive the one or more SSBs on resources that overlap with the downlink communication from the serving cell is based at least in part on components of the UE (e.g., a static configuration), power resources of the UE (e.g., a static configuration and/or a dynamic configuration), and/or channel conditions of the UE (e.g., a dynamic configuration).

As shown by reference number 615, the UE may transmit, and the base station may receive, an indication of SSB timing for a second cell (e.g., a non-serving cell) and/or one or more additional SSB timings for one or more additional cells. In some aspects, the UE transmits the timing for the second cell based at least in part on a previously received communication via the second cell. In some aspects, the UE may be unaware of the timing for the second cell. In some aspects, the UE may transmit an indication of a PCI of the second cell, and the base station may estimate the timing for the second cell based at least in part on the PCI of the second cell. In some aspects, transmission of the indication of the SSB timing is optional and/or may be omitted.

As shown by reference number 620, the base station may identify resources for a downlink communication for the UE. For example, the base station may identify resources that overlap with an allocation of resources for reception of the SSB of the second cell. The base station may determine that the UE is to receive both of the SSB and the downlink communication based at least in part on the indication of the capability of the UE, as described in connection with reference number 610. In some aspects, the base station may determine that the UE is to rate match the downlink communication using resources of the allocation that are not overlapping with the SSB of the second cell based at least in part on an indication of a number of SSBs that the UE is to receive that satisfies a threshold. The base station may further determine that the UE is to rate match the downlink communication using resources of the allocation that are not within an amount of time (e.g., in RAN timing units, such as symbols) from the allocation of resources for reception of the SSB of the second cell and/or one or more additional SSBs of one or more additional cells. In some aspects, the amount of time may be based at least in part on a communication protocol and/or based at least in part on the configuration information described in connection with reference number 605 or other configuration information. In some aspects, the amount of time may be based at least in part on subcarrier spacing of a downlink communication and/or a subcarrier spacing associated with the first cell.

As shown by reference number 620, the UE may receive, and the base station may transmit, an indication of a first allocation for reception of the downlink communication. For example, the UE may receive the first allocation that overlaps with a second allocation for reception of an SSB for a second cell.

In some aspects, the first allocation overlaps with the second allocation and a guard window that extends for a first number of symbols before a scheduled transmission of the SSB and/or an additional SSB (e.g., an earlier of the SSB and the additional SSB) and for a second number of symbols after the scheduled transmission of the SSB (e.g., a later of the SSB and the additional SSB). The guard window may be configured as a timing window during which the UE is to rate match the downlink communication. In some aspects, the first number of symbols and/or the second number of symbols may be based at least in part on a difference in reception timings, at the UE, associated with the first cell and the second cell. For example, the base station may estimate a length of the guard window based at least in part on a location of the UE (e.g., relative to a base station of the second cell) and/or based at least in part on a configured length of the guard window. In some aspects, the difference in the reception timings at the UE is unknown (e.g., by the UE and/or the base station) before reception of the SSB.

As shown by reference number 625, the UE may receive the downlink communication during a first set of resources that are non-overlapping resources of the first allocation. As shown by reference number 630, the UE may receive the SSB and/or the additional SSB during a second set of resources that are overlapping resources of the first allocation. In some aspects, the non-overlapping resources of the first allocation may include resources that are before the overlapping resources and/or may include non-overlapping resources that are after the overlapping resources of the second allocation. In some aspects, the UE may receive the downlink communication during the non-overlapping resources that are outside of the guard window. In some aspects, the UE may receive the SSB and/or the additional SSB during the overlapping resources within an SSB measurement timing configuration window or during the overlapping resources outside of the SSB measurement timing configuration window.

As shown by reference number 635, the UE may rate match the non-overlapping resources. For example, the UE may discard signal samples within the overlapping resources and/or within the guard window for decoding and/or demodulating the downlink communication.

Based at least in part on the UE receiving (e.g., using rate matching) the PDSCH communication using non-overlapping resources, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

As indicated above, FIG. 6 is provided as an example. Other examples may differ from what is described with regard to FIG. 6.

Figure 7A:
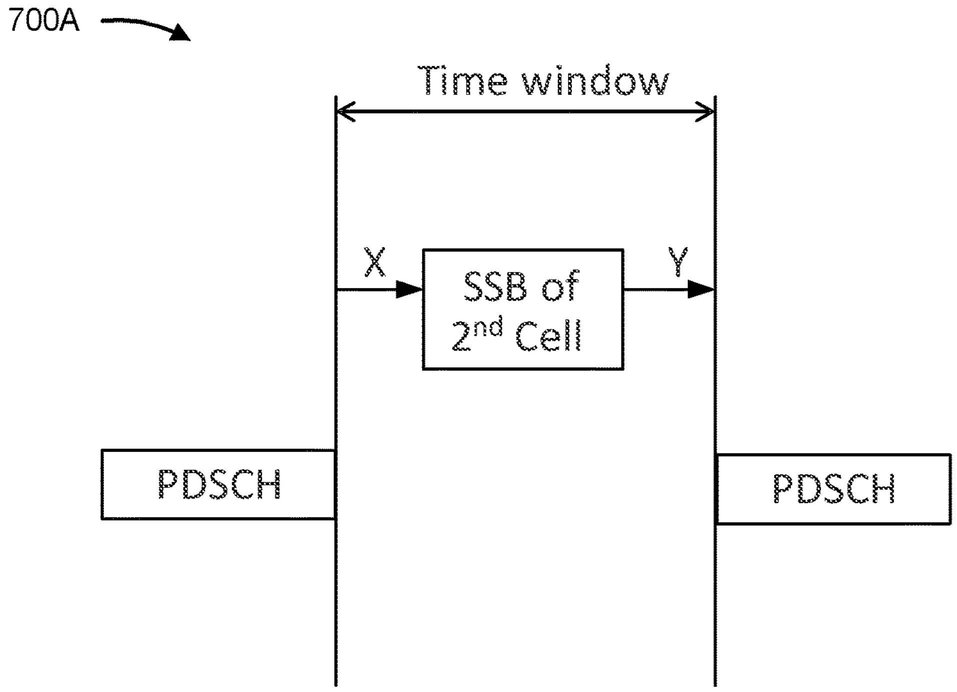
Figure 7B:
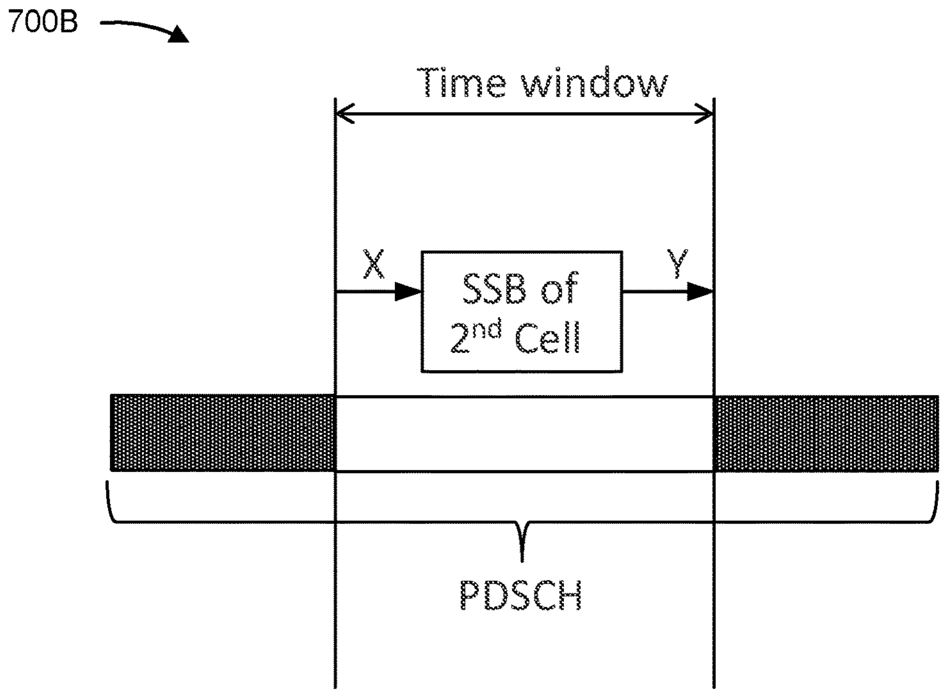
Figure 7C:
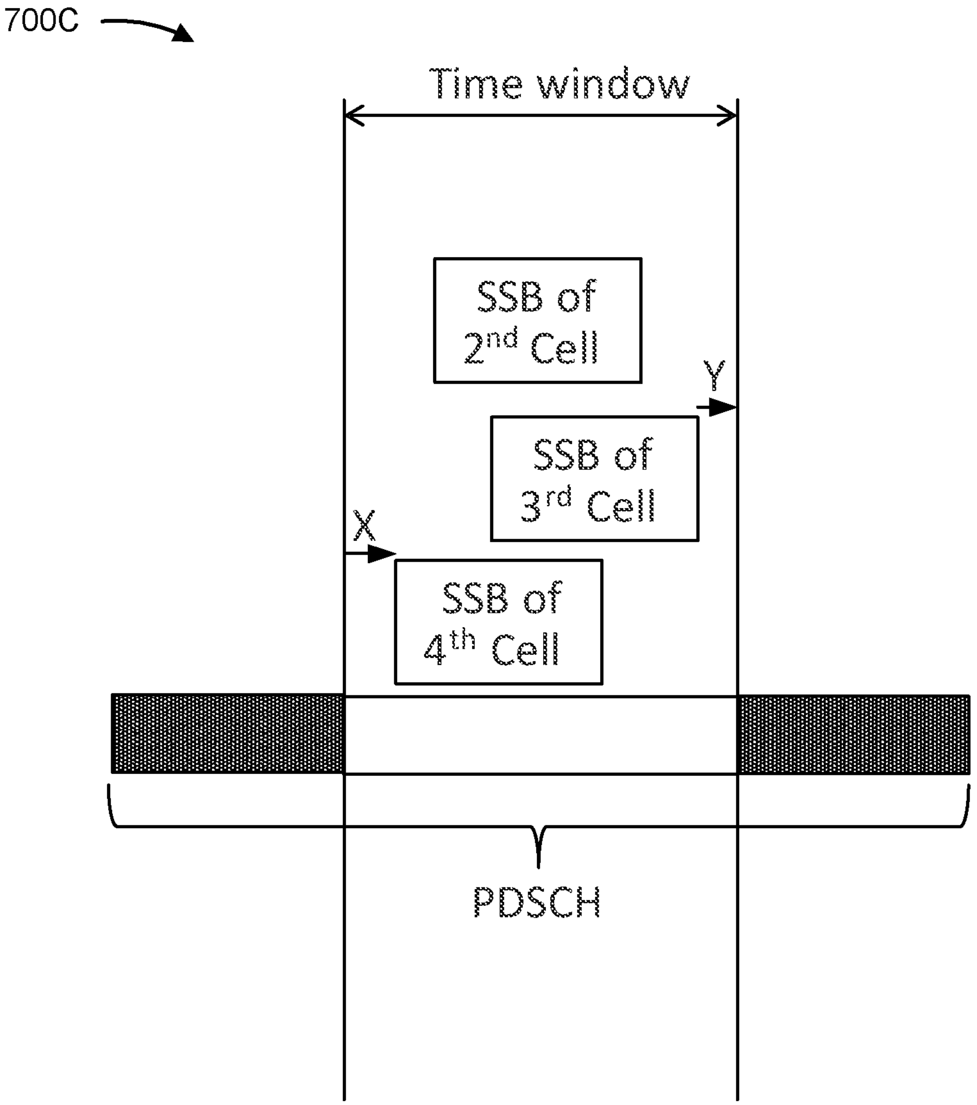

FIGS. 7A-7C are diagrams illustrating examples 700A, 700B, and 700C associated with UE support for tracking timing of non-serving cells, in accordance with the present disclosure. As shown in FIGS. 7A-7C, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIGS. 7A-7C. The base station and the UE may be associated with a first cell (e.g., a serving cell).

As shown in FIG. 7A, and by example 700A, the UE may receive a PDSCH communication outside of a time window associated with an SSB of a second cell. The base station may be configured to transmit the PDSCH in resources that are outside of the time window (e.g., in resources before and/or after the time window). The time window may extend X RAN timing units (e.g., symbols or slots, among other examples) before transmission of the SSB of the second cell and/or may extend Y RAN timing units after transmission of the SSB of the second cell.

As shown in FIG. 7B, and by example 700B, the UE may receive a PDSCH communication scheduled for resources outside of a time window associated with an SSB of a second cell and scheduled for resources inside of the time window. As described herein, the time window may extend X RAN timing units (e.g., symbols) before transmission of the SSB of the second cell and/or may extend Y RAN timing units after transmission of the SSB of the second cell. The UE may be configured to rate match the PDSCH communication based at least in part on discarding samples (e.g., and sizing a transport block based at least in part on discarding the samples) of the PDSCH received during the timing window. The UE may be configured or indicated by the DCI to rate match the PDSCH communication based at least in part on not counting the reception of the PDSCH received during the timing window. The parts of PDSCH received before and after the timing window may be for a single PDSCH reception, and mapped in a non-consecutive manner.

As shown in FIG. 7C, and by example 700C, the UE may receive a PDSCH communication scheduled for resources outside of a time window associated with multiple SSBs (e.g., SSBs of a second cell, a third cell, and/or a fourth cell, among other examples) of multiple cells and scheduled for resources inside of the time window. As described herein, the time window may extend X RAN timing units (e.g., symbols) before transmission of an earliest SSB (e.g., the SSB of the fourth cell) and/or may extend Y RAN timing units after transmission of a latest SSB (e.g., the SSB of the third cell). The UE may be configured to rate match the PDSCH communication based at least in part on discarding samples (e.g., and sizing a transport block based at least in part on discarding the samples) of the PDSCH received during the timing window.

Based at least in part on the UE receiving (e.g., using rate matching) the PDSCH communication using non-overlapping resources, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

Based at least in part on the UE receiving the PDSCH communication outside of overlapping resources and/or the guard window, or based at least in part on the UE rate matching the PDSCH communication using non-overlapping resources, the UE may improve reception of the PDSCH communication while also supporting reception of the SSB for the second cell. In this way, the UE and the serving cell base station may conserve network, power, communication, and/or computing resources to detect a failure to receive the PDSCH communication and/or to re-transmit and/or attempt to receive the PDSCH communication.

As indicated above, FIGS. 7A-7C is provided as an example. Other examples may differ from what is described with regard to FIGS. 7A-7C.

Figure 8:
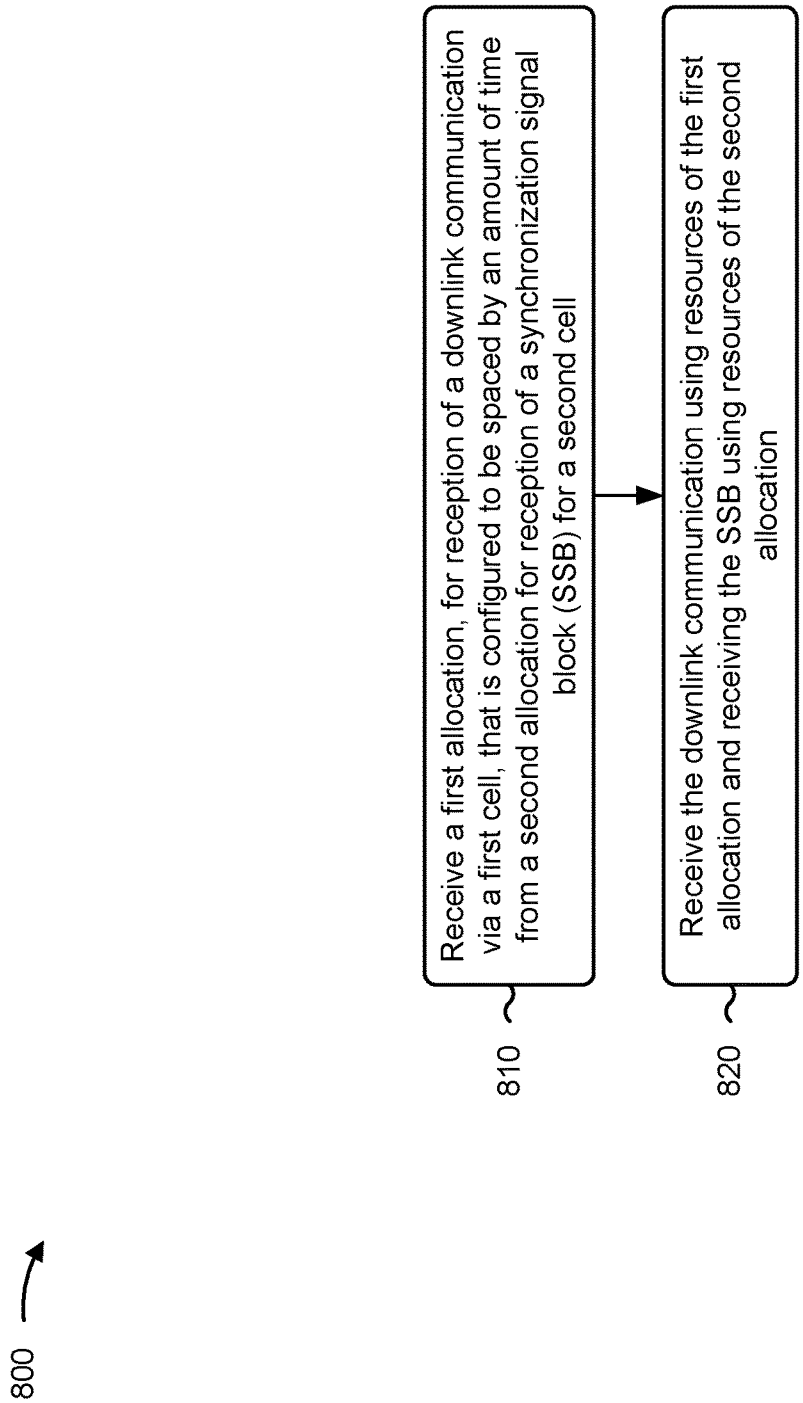
FIGS. 8-13 are diagrams illustrating example processes associated with receiving SSBs from non-serving cells, in accordance with the present disclosure.

FIG. 8 is a diagram illustrating an example process 800 performed, for example, by a UE, in accordance with the present disclosure. Example process 800 is an example where the UE (e.g., UE 120) performs operations associated with receiving SSBs from non-serving cells.

As shown in FIG. 8, in some aspects, process 800 may include receiving a first allocation, for reception of a downlink communication via a first cell, that is configured to be spaced by an amount of time from a second allocation for reception of a SSB for a second cell (block 810). For example, the UE (e.g., using communication manager 140 and/or reception component 1402, depicted in FIG. 14) may receive a first allocation, for reception of a downlink communication via a first cell, that is configured to be spaced by an amount of time from a second allocation for reception of a SSB for a second cell, as described above.

As further shown in FIG. 8, in some aspects, process 800 may include receiving the downlink communication using resources of the first allocation and receiving the SSB using resources of the second allocation (block 820). For example, the UE (e.g., using communication manager 140 and/or reception component 1402, depicted in FIG. 14) may receive the downlink communication using resources of the first allocation and receiving the SSB using resources of the second allocation, as described above.

Process 800 may include additional aspects, such as any single aspect or any combination of aspects described below and/or in connection with one or more other processes described elsewhere herein.

In a first aspect, the amount of time is based at least in part on a communication protocol or configuration information.

In a second aspect, alone or in combination with the first aspect, the amount of time is based at least in part on a subcarrier spacing of the downlink communication.

In a third aspect, alone or in combination with one or more of the first and second aspects, the second allocation for reception of the SSB is associated with a guard window, during which a base station of the first cell is configured not to transmit the downlink communication, that extends for a first number of symbols before a scheduled transmission of the SSB and for a second number of symbols after the scheduled transmission of the SSB.

In a fourth aspect, alone or in combination with one or more of the first through third aspects, one or more of the first number of symbols or the second number of symbols is based at least in part on a difference in reception timings, at the UE, associated with the first cell and the second cell.

In a fifth aspect, alone or in combination with one or more of the first through fourth aspects, the difference in the reception timings at the UE is unknown before reception of the SSB.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
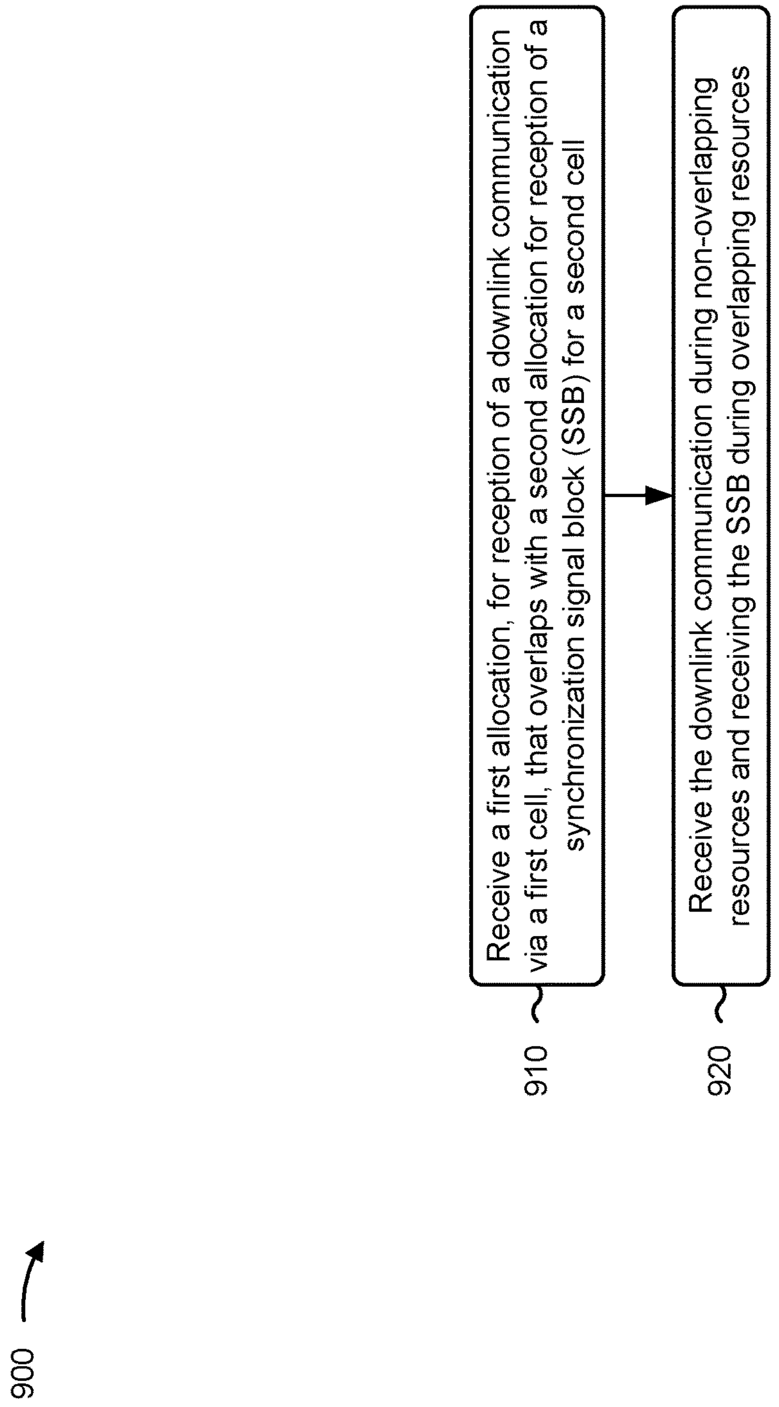

FIG. 9 is a diagram illustrating an example process 900 performed, for example, by a UE, in accordance with the present disclosure. Example process 900 is an example where the UE (e.g., UE 120) performs operations associated with SSBs from non-serving cells.

As shown in FIG. 9, in some aspects, process 900 may include receiving a first allocation, for reception of a downlink communication via a first cell, that overlaps with a second allocation for reception of a SSB for a second cell (block 910). For example, the UE (e.g., using communication manager 140 and/or reception component 1402, depicted in FIG. 14) may receive a first allocation, for reception of a downlink communication via a first cell, that overlaps with a second allocation for reception of a SSB for a second cell, as described above.

As further shown in FIG. 9, in some aspects, process 900 may include receiving the downlink communication during non-overlapping resources and receiving the SSB during overlapping resources (block 920). For example, the UE (e.g., using communication manager 140 and/or reception component 1402, depicted in FIG. 14) may receive the downlink communication during non-overlapping resources and receiving the SSB during overlapping resources, as described above.

Process 900 may include additional aspects, such as any single aspect or any combination of aspects described below and/or in connection with one or more other processes described elsewhere herein.

In a first aspect, the first allocation overlaps with the second allocation and a guard window that extends for a first number of symbols before a scheduled transmission of the SSB and for a second number of symbols after the scheduled transmission of the SSB, and wherein receiving the downlink communication during the non-overlapping resources comprises receiving the downlink communication during the non-overlapping resources that are outside of the guard window.

In a second aspect, alone or in combination with the first aspect, one or more of the first number of symbols or the second number of symbols is based at least in part on a difference in reception timings, at the UE, associated with the first cell and the second cell.

In a third aspect, alone or in combination with one or more of the first and second aspects, the difference in the reception timings at the UE is unknown before reception of the SSB.

In a fourth aspect, alone or in combination with one or more of the first through third aspects, one or more of the first number of symbols or the second number of symbols is based at least in part on a subcarrier spacing associated with the first cell.

In a fifth aspect, alone or in combination with one or more of the first through fourth aspects, receiving the SSB during the overlapping resources comprises receiving the SSB during the overlapping resources within an SSB measurement timing configuration window, or receiving the SSB during the overlapping resources outside of the SSB measurement timing configuration window.

In a sixth aspect, alone or in combination with one or more of the first through fifth aspects, receiving the downlink communication during the non-overlapping resources comprises receiving the downlink communication during the non-overlapping resources based at least in part on rate matching the non-overlapping resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
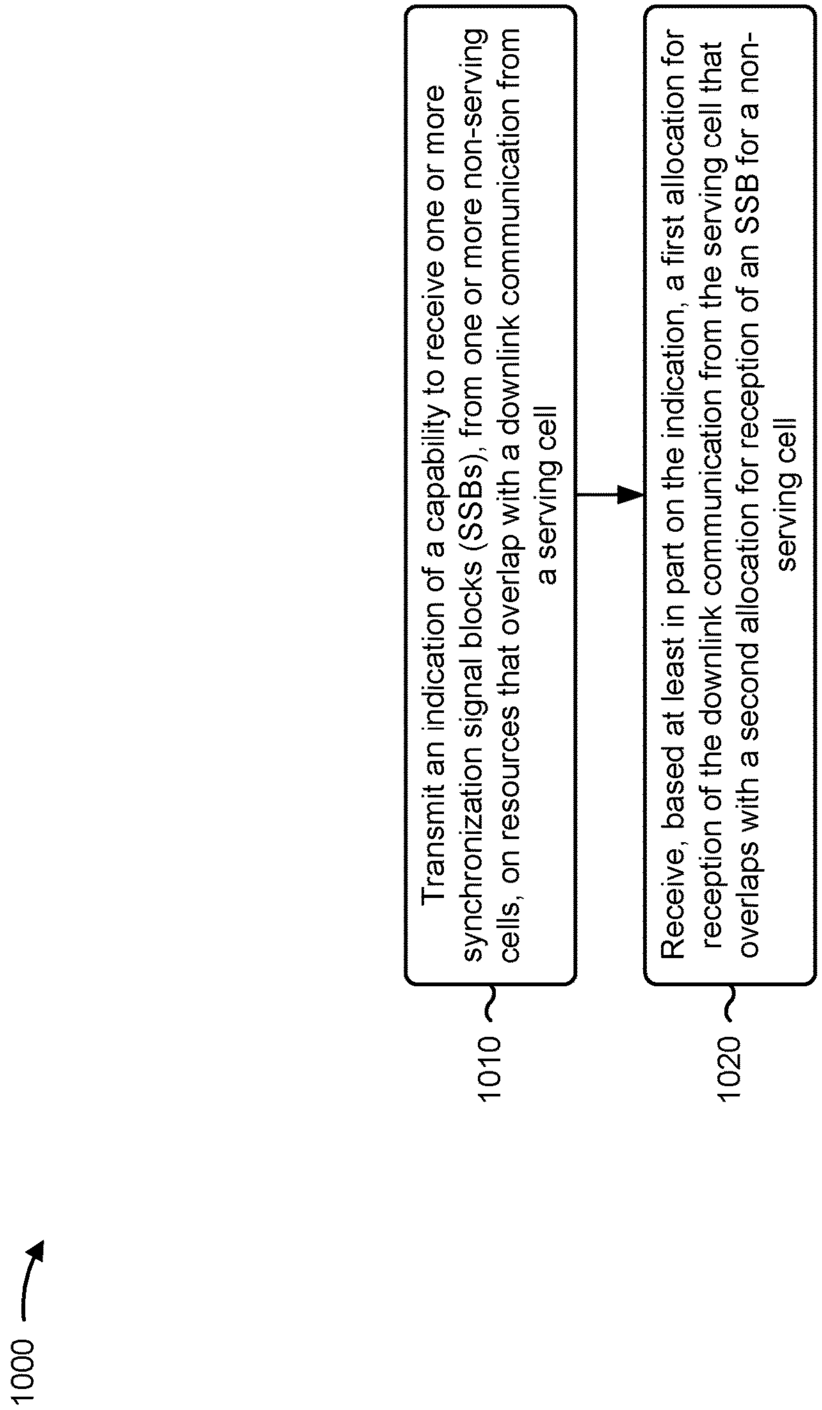

FIG. 10 is a diagram illustrating an example process 1000 performed, for example, by a UE, in accordance with the present disclosure. Example process 1000 is an example where the UE (e.g., UE 120) performs operations associated with SSBs from non-serving cells.

As shown in FIG. 10, in some aspects, process 1000 may include transmitting an indication of a capability to receive one or more SSBs, from one or more non-serving cells, on resources that overlap with a downlink communication from a serving cell (block 1010). For example, the UE (e.g., using communication manager 140 and/or transmission component 1404, depicted in FIG. 14) may transmit an indication of a capability to receive one or more SSBs, from one or more non-serving cells, on resources that overlap with a downlink communication from a serving cell, as described above.

As further shown in FIG. 10, in some aspects, process 1000 may include receiving, based at least in part on the indication, a first allocation for reception of the downlink communication from the serving cell that overlaps with a second allocation for reception of an SSB for a non-serving cell (block 1020). For example, the UE (e.g., using communication manager 140 and/or reception component 1402, depicted in FIG. 14) may receive, based at least in part on the indication, a first allocation for reception of the downlink communication from the serving cell that overlaps with a second allocation for reception of an SSB for a non-serving cell, as described above.

Process 1000 may include additional aspects, such as any single aspect or any combination of aspects described below and/or in connection with one or more other processes described elsewhere herein.

In a first aspect, process 1000 includes receiving the downlink communication via a first set of resources of the first allocation, and receiving the SSB via a second set of resources, that overlap with at least a portion of the first set of resources, of the first allocation.

In a second aspect, alone or in combination with the first aspect, process 1000 includes receiving the downlink communication via a first set of resources of the first allocation, and receiving the SSB and an additional SSB via a second set of resources, that are overlapping with the first set of resources, of the first allocation.

In a third aspect, alone or in combination with one or more of the first and second aspects, receiving the downlink communication via the first set of resources of the first allocation comprises receiving the downlink communication during the first set of resources based at least in part on rate matching the first set of resources.

In a fourth aspect, alone or in combination with one or more of the first through third aspects, the first allocation comprises the first set of resources, the second set of resources, and a guard window that extends for a first number of symbols before a scheduled transmission of an earlier of the SSB and the additional SSB, and for a second number of symbols after a scheduled transmission of a later of the SSB and the additional SSB, wherein the first set of resources are outside of the guard window.

In a fifth aspect, alone or in combination with one or more of the first through fourth aspects, one or more of the first number of symbols or the second number of symbols is based at least in part on a difference in reception timings, at the UE, associated with the serving cell and the non-serving cell.

In a sixth aspect, alone or in combination with one or more of the first through fifth aspects, the difference in the reception timings at the UE is unknown before reception of the SSB.

In a seventh aspect, alone or in combination with one or more of the first through sixth aspects, one or more of the first number of symbols or the second number of symbols is based at least in part on a subcarrier spacing associated with the serving cell.

In an eighth aspect, alone or in combination with one or more of the first through seventh aspects, receiving the SSB comprises receiving the SSB within an SSB measurement timing configuration window, or receiving the SSB outside of the SSB measurement timing configuration window.

In a ninth aspect, alone or in combination with one or more of the first through eighth aspects, the capability to receive the one or more SSBs on resources that overlap with the downlink communication from the serving cell is based at least in part on one or more of components of the UE, power resources of the UE, or channeling conditions of the UE.

In a tenth aspect, alone or in combination with one or more of the first through ninth aspects, transmitting the indication of the capability to receive the one or more SSBs on resources that overlap with the downlink communication from the serving cell comprises transmitting the indication via radio resource control signaling, or transmitting the indication via dynamic signaling.

In an eleventh aspect, alone or in combination with one or more of the first through tenth aspects, the indication of the capability to receive the one or more SSBs on resources that overlap with the downlink communication from the serving cell comprises an indication of a number of SSBs having different PCIs that the UE is capable of receiving simultaneously on resources that overlap with the downlink communication from the serving cell.

In a twelfth aspect, alone or in combination with one or more of the first through eleventh aspects, the indication of the number of SSBs having different PCIs that the UE is capable to receive simultaneously on resources that overlap with the downlink communication from the serving cell comprises one or more indications of a number of SSBs, that the UE is capable to receive, having different PCIs and having reception timing differences that are less than a cyclic prefix associated with the serving cell, a number of SSBs, that the UE is capable to receive, having different PCIs and having reception timing differences that are greater than a cyclic prefix associated with the serving cell, or a number of SSBs, that the UE is capable to receive, having different PCIs and having reception timing differences from a serving cell SSB that are less than a reception timing difference threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
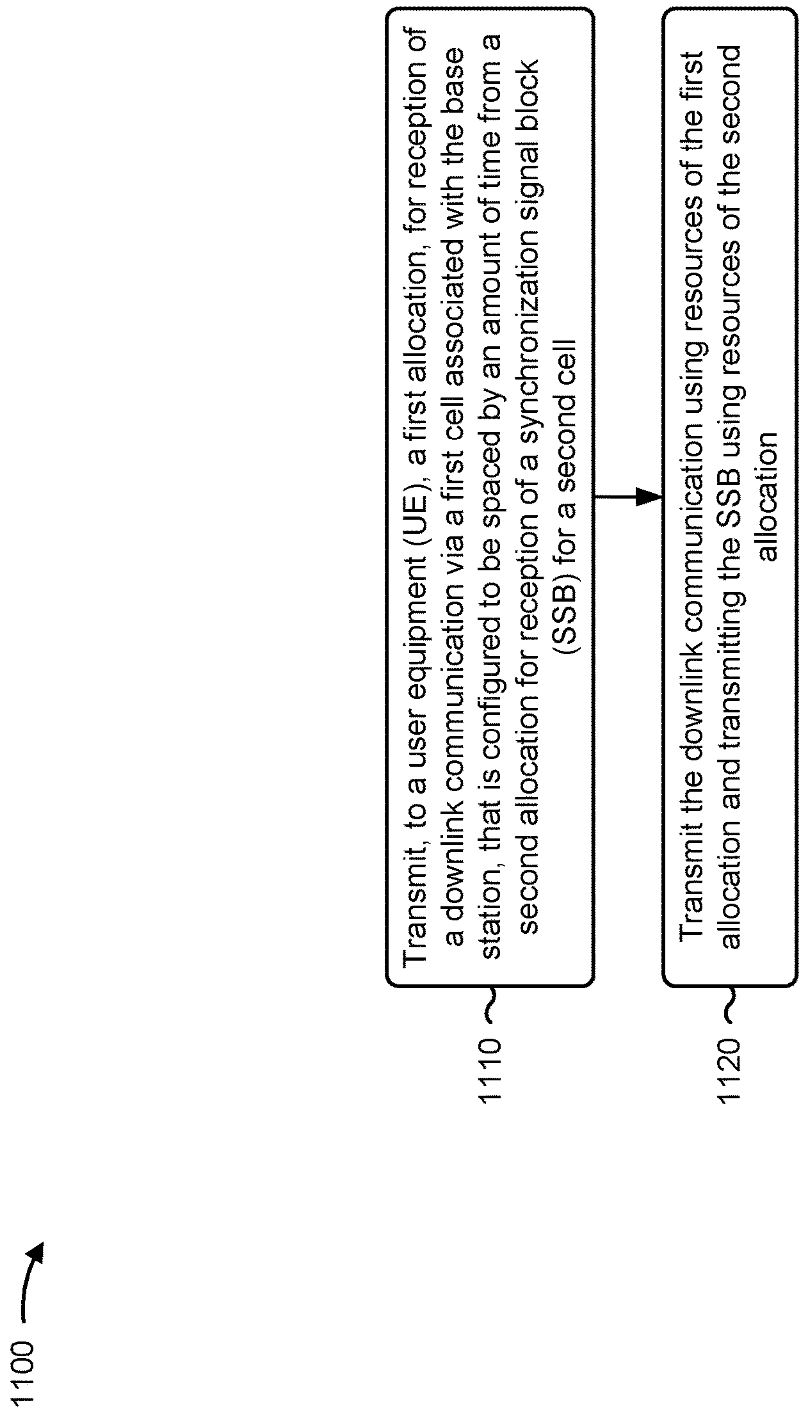

FIG. 11 is a diagram illustrating an example process 1100 performed, for example, by a base station, in accordance with the present disclosure. Example process 1100 is an example where the base station (e.g., base station 110) performs operations associated with SSBs from non-serving cells.

As shown in FIG. 11, in some aspects, process 1100 may include transmitting, to a UE, a first allocation, for reception of a downlink communication via a first cell associated with the base station, that is configured to be spaced by an amount of time from a second allocation for reception of a SSB for a second cell (block 1110). For example, the base station (e.g., using communication manager 150 and/or transmission component 1504, depicted in FIG. 15) may transmit, to a UE, a first allocation, for reception of a downlink communication via a first cell associated with the base station, that is configured to be spaced by an amount of time from a second allocation for reception of a SSB for a second cell, as described above.

As further shown in FIG. 11, in some aspects, process 1100 may include transmitting the downlink communication using resources of the first allocation and transmitting the SSB using resources of the second allocation (block 1120). For example, the base station (e.g., using communication manager 150 and/or transmission component 1504, depicted in FIG. 15) may transmit the downlink communication using resources of the first allocation and transmitting the SSB using resources of the second allocation, as described above.

Process 1100 may include additional aspects, such as any single aspect or any combination of aspects described below and/or in connection with one or more other processes described elsewhere herein.

In a first aspect, the amount of time is based at least in part on a communication protocol or configuration information.

In a second aspect, alone or in combination with the first aspect, the amount of time is based at least in part on a subcarrier spacing of the downlink communication.

In a third aspect, alone or in combination with one or more of the first and second aspects, the second allocation for reception of the SSB is associated with a guard window, during which the base station is configured not to transmit the downlink communication, that extends for a first number of symbols before a scheduled transmission of the SSB and for a second number of symbols after the scheduled transmission of the SSB.

In a fourth aspect, alone or in combination with one or more of the first through third aspects, one or more of the first number of symbols or the second number of symbols is based at least in part on a difference in reception timings, at the UE, associated with the first cell and the second cell.

In a fifth aspect, alone or in combination with one or more of the first through fourth aspects, the difference in the reception timings at the UE is unknown before reception of the SSB.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
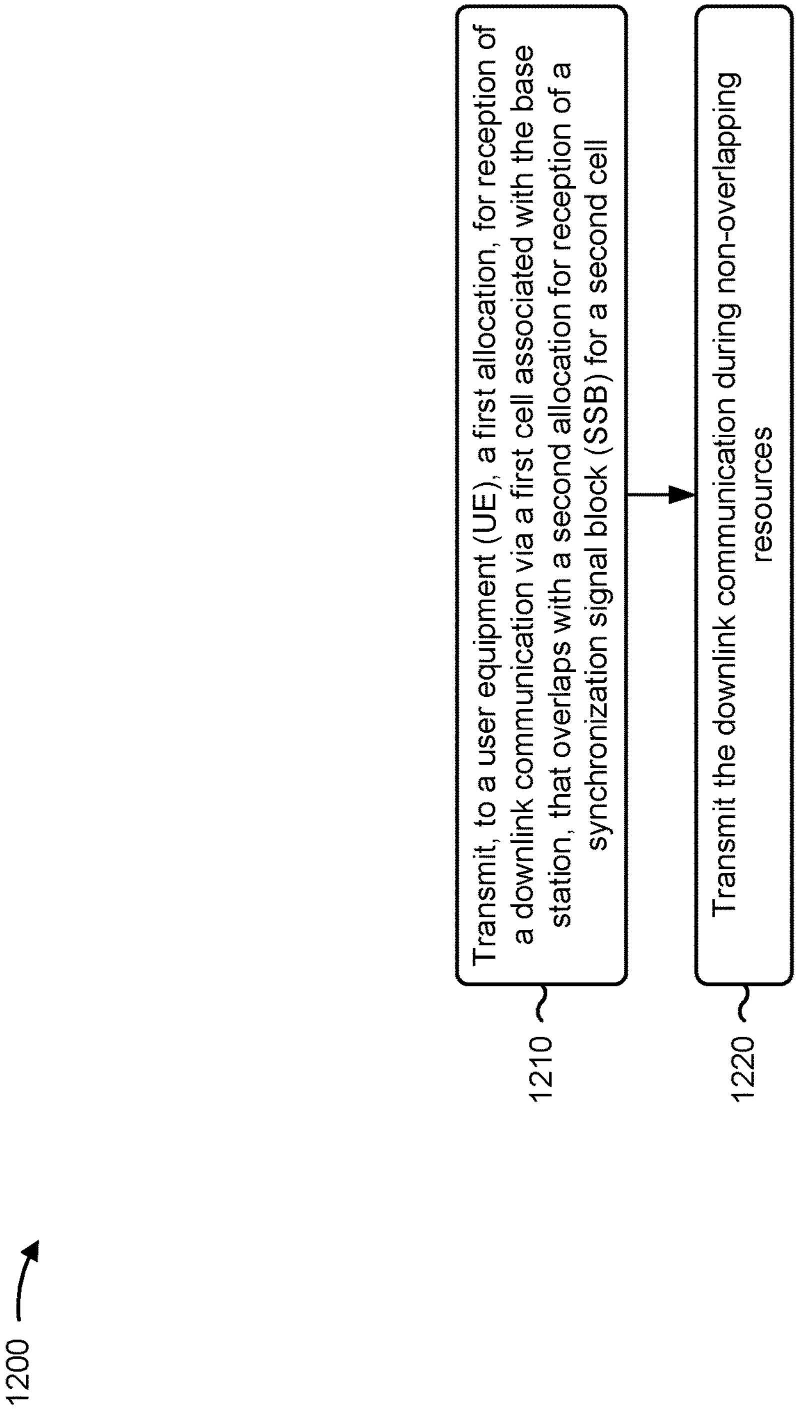

FIG. 12 is a diagram illustrating an example process 1200 performed, for example, by a base station, in accordance with the present disclosure. Example process 1200 is an example where the base station (e.g., base station 110) performs operations associated with SSBs from non-serving cells.

As shown in FIG. 12, in some aspects, process 1200 may include transmitting, to a UE, a first allocation, for reception of a downlink communication via a first cell associated with the base station, that overlaps with a second allocation for reception of a SSB for a second cell (block 1210). For example, the base station (e.g., using communication manager 150 and/or transmission component 1504, depicted in FIG. 15) may transmit, to a UE, a first allocation, for reception of a downlink communication via a first cell associated with the base station, that overlaps with a second allocation for reception of a SSB for a second cell, as described above.

As further shown in FIG. 12, in some aspects, process 1200 may include transmitting the downlink communication during non-overlapping resources (block 1220). For example, the base station (e.g., using communication manager 150 and/or transmission component 1504, depicted in FIG. 15) may transmit the downlink communication during non-overlapping resources, as described above.

Process 1200 may include additional aspects, such as any single aspect or any combination of aspects described below and/or in connection with one or more other processes described elsewhere herein.

In a first aspect, the first allocation overlaps with the second allocation and a guard window that extends for a first number of symbols before a scheduled transmission of the SSB and for a second number of symbols after the scheduled transmission of the SSB, and wherein transmitting the downlink communication during the non-overlapping resources comprises transmitting the downlink communication during the non-overlapping resources that are outside of the guard window.

In a second aspect, alone or in combination with the first aspect, one or more of the first number of symbols or the second number of symbols is based at least in part on a difference in reception timings, at the UE, associated with the first cell and the second cell.

In a third aspect, alone or in combination with one or more of the first and second aspects, the difference in the reception timings at the UE is unknown before reception of the SSB.

In a fourth aspect, alone or in combination with one or more of the first through third aspects, one or more of the first number of symbols or the second number of symbols is based at least in part on a subcarrier spacing associated with the first cell.

In a fifth aspect, alone or in combination with one or more of the first through fourth aspects, transmitting the downlink communication during the non-overlapping resources comprises receiving the downlink communication during the non-overlapping resources based at least in part on rate matching the non-overlapping resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
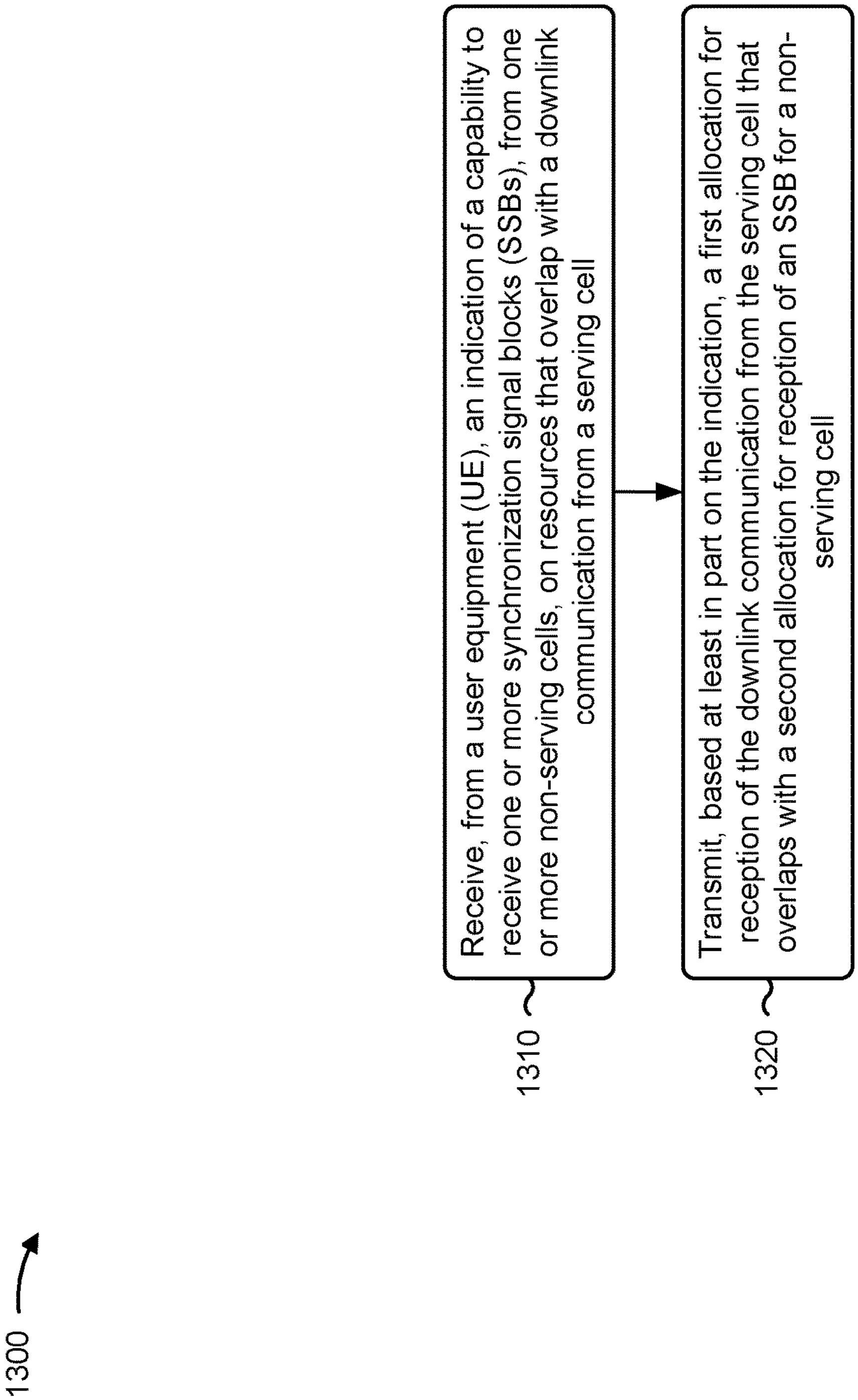

FIG. 13 is a diagram illustrating an example process 1300 performed, for example, by a base station, in accordance with the present disclosure. Example process 1300 is an example where the base station (e.g., base station 110) performs operations associated with SSBs from non-serving cells.

As shown in FIG. 13, in some aspects, process 1300 may include receiving, from a UE, an indication of a capability to receive one or more SSBs, from one or more non-serving cells, on resources that overlap with a downlink communication from a serving cell (block 1310). For example, the base station (e.g., using communication manager 150 and/or reception component 1502, depicted in FIG. 15) may receive, from a UE, an indication of a capability to receive one or more SSBs, from one or more non-serving cells, on resources that overlap with a downlink communication from a serving cell, as described above.

As further shown in FIG. 13, in some aspects, process 1300 may include transmitting, based at least in part on the indication, a first allocation for reception of the downlink communication from the serving cell that overlaps with a second allocation for reception of an SSB for a non-serving cell (block 1320). For example, the base station (e.g., using communication manager 150 and/or transmission component 1504, depicted in FIG. 15) may transmit, based at least in part on the indication, a first allocation for reception of the downlink communication from the serving cell that overlaps with a second allocation for reception of an SSB for a non-serving cell, as described above.

Process 1300 may include additional aspects, such as any single aspect or any combination of aspects described below and/or in connection with one or more other processes described elsewhere herein.

In a first aspect, process 1300 includes transmitting the downlink communication via a first set of resources of the first allocation.

In a second aspect, alone or in combination with the first aspect, process 1300 includes transmitting the downlink communication via a first set of resources of the first allocation.

In a third aspect, alone or in combination with one or more of the first and second aspects, transmitting the downlink communication via the first set of resources of the first allocation comprises transmitting the downlink communication during the first set of resources based at least in part on rate matching the first set of resources.

In a fourth aspect, alone or in combination with one or more of the first through third aspects, the first allocation comprises the first set of resources, a second set of resources of the second allocation, and a guard window that extends for a first number of symbols before a scheduled transmission of an earlier of the SSB and an additional SSB, and for a second number of symbols after a scheduled transmission of a later of the SSB and the additional SSB, wherein the first set of resources are outside of the guard window.

In a fifth aspect, alone or in combination with one or more of the first through fourth aspects, one or more of the first number of symbols or the second number of symbols is based at least in part on a difference in reception timings, at the UE, associated with the downlink communication and one or more of the SSB or the additional SSB.

In a sixth aspect, alone or in combination with one or more of the first through fifth aspects, the difference in the reception timings at the UE is unknown before reception of one or more of the SSB or the additional SSB.

In a seventh aspect, alone or in combination with one or more of the first through sixth aspects, one or more of the first number of symbols or the second number of symbols is based at least in part on a subcarrier spacing associated with the serving cell.

In an eighth aspect, alone or in combination with one or more of the first through seventh aspects, the capability to receive the one or more SSBs on resources that overlap with the downlink communication from the serving cell is based at least in part on one or more of components of the UE, power resources of the UE, or channeling conditions of the UE.

In a ninth aspect, alone or in combination with one or more of the first through eighth aspects, receiving the indication of the capability to receive the one or more SSBs on resources that overlap with the downlink communication from the serving cell comprises receiving the indication via radio resource control signaling, or receiving the indication via dynamic signaling.

In a tenth aspect, alone or in combination with one or more of the first through ninth aspects, the indication of the capability to receive the one or more SSBs on resources that overlap with the downlink communication from the serving cell comprises an indication of a number of SSBs having different PCIs that the UE is capable of receiving simultaneously on resources that overlap with the downlink communication from the serving cell.

In an eleventh aspect, alone or in combination with one or more of the first through tenth aspects, the indication of the number of SSBs having different PCIs that the UE is capable to receive simultaneously on resources that overlap with the downlink communication from the serving cell comprises one or more indications of a number of SSBs, that the UE is capable to receive, having different PCIs and having reception timing differences that are less than a cyclic prefix associated with the serving cell, a number of SSBs, that the UE is capable to receive, having different PCIs and having reception timing differences that are greater than a cyclic prefix associated with the serving cell, or a number of SSBs, that the UE is capable to receive, having different PCIs and having reception timing differences from a serving cell SSB that are less than a reception timing difference threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
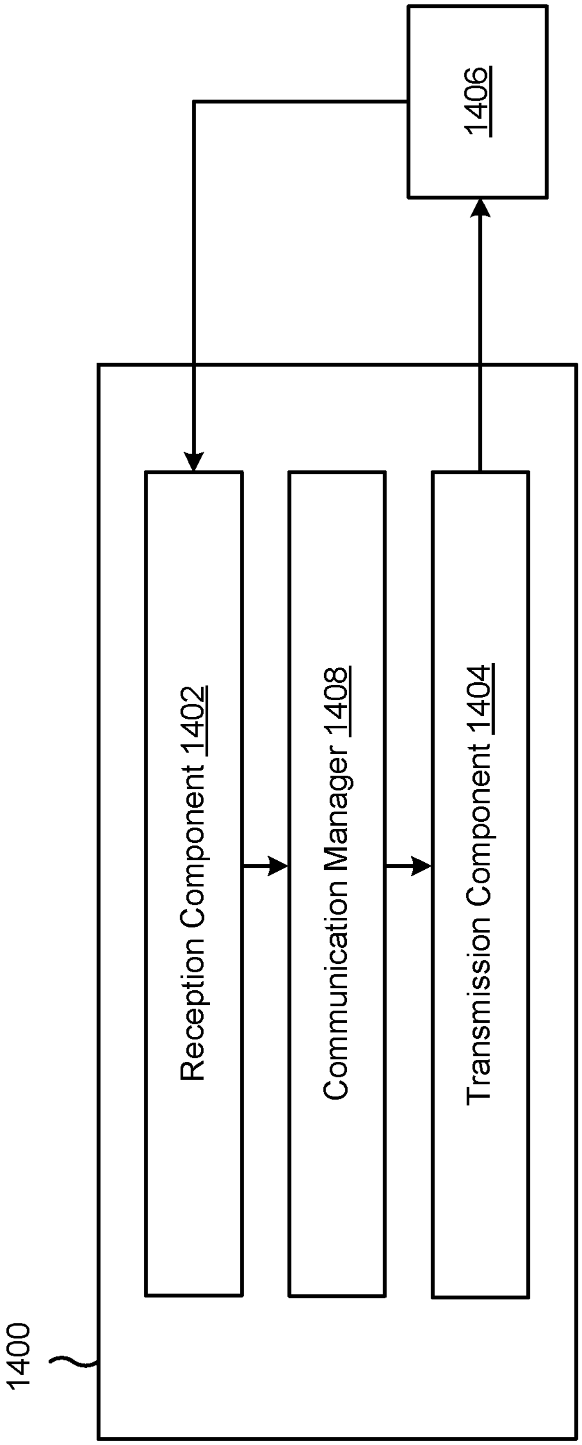
FIGS. 14 and 15 are diagrams of example apparatuses for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (e.g., via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1408 (e.g., the communication manager 140).

In some aspects, the apparatus 1400 may be configured to perform one or more operations described herein in connection with FIGS. 4-7C. Additionally, or alternatively, the apparatus 1400 may be configured to perform one or more processes described herein, such as process 800 of FIG. 8, process 900 of FIG. 9, process 1000 of FIG. 10, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive a first allocation, for reception of a downlink communication via a first cell, that is configured to be spaced by an amount of time from a second allocation for reception of a SSB for a second cell. The reception component 1402 may receive the downlink communication using resources of the first allocation and receiving the SSB using resources of the second allocation.

The reception component 1402 may receive a first allocation, for reception of a downlink communication via a first cell, that overlaps with a second allocation for reception of a SSB for a second cell. The reception component 1402 may receive the downlink communication during non-overlapping resources and receiving the SSB during overlapping resources.

The transmission component 1404 may transmit an indication of a capability to receive one or more SSBs, from one or more non-serving cells, on resources that overlap with a downlink communication from a serving cell. The reception component 1402 may receive, based at least in part on the indication, a first allocation for reception of the downlink communication from the serving cell that overlaps with a second allocation for reception of an SSB for a non-serving cell.

The reception component 1402 may receive the downlink communication via a first set of resources of the first allocation.

The reception component 1402 may receive the SSB via a second set of resources, that overlap with at least a portion of the first set of resources, of the first allocation.

The reception component 1402 may receive the downlink communication via a first set of resources of the first allocation.

The reception component 1402 may receive the SSB and an additional SSB via a second set of resources, that are overlapping with the first set of resources, of the first allocation.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
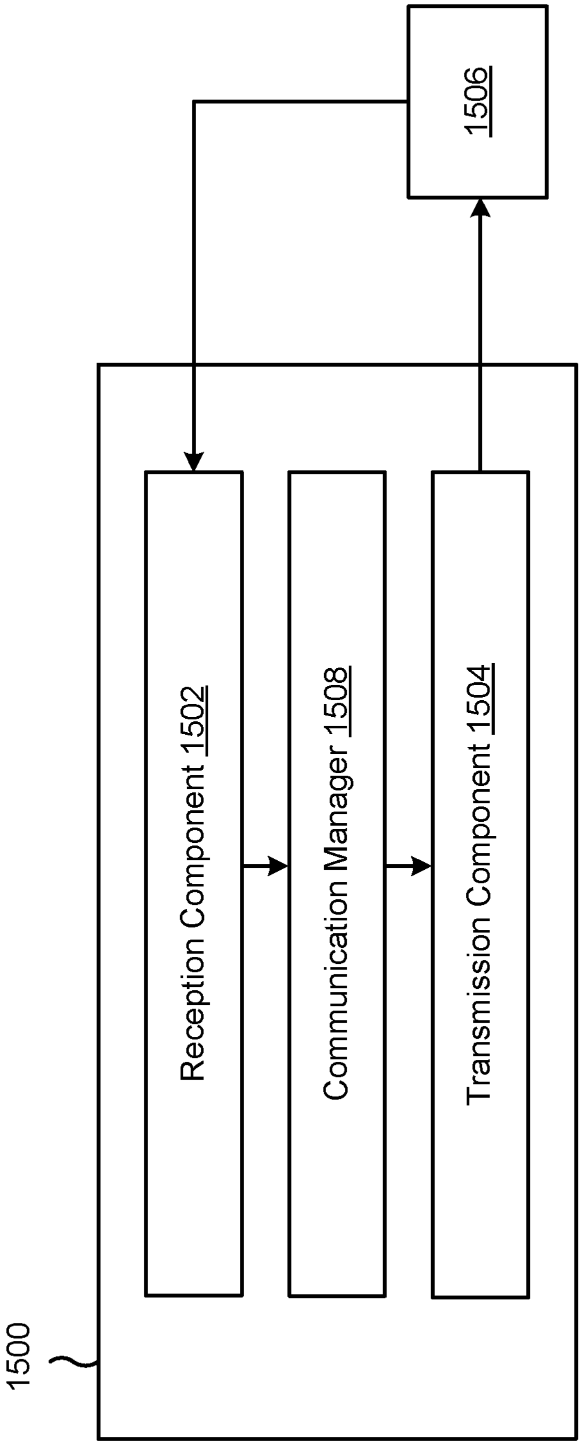

FIG. 15 is a diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (e.g., via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a communication manager 1508 (e.g., the communication manager 150).

In some aspects, the apparatus 1500 may be configured to perform one or more operations described herein in connection with FIGS. 4-7C. Additionally, or alternatively, the apparatus 1500 may be configured to perform one or more processes described herein, such as process 1100 of FIG. 11, process 1200 of FIG. 12, process 1300 of FIG. 13, or a combination thereof. In some aspects, the apparatus 1500 and/or one or more components shown in FIG. 15 may include one or more components of the base station described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the base station described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the base station described in connection with FIG. 2. In some aspects, the transmission component 1504 may be co-located with the reception component 1502 in a transceiver.

The transmission component 1504 may transmit, to a UE, a first allocation, for reception of a downlink communication via a first cell associated with the base station, that is configured to be spaced by an amount of time from a second allocation for reception of a SSB for a second cell. The transmission component 1504 may transmit the downlink communication using resources of the first allocation and transmitting the SSB using resources of the second allocation.

The transmission component 1504 may transmit, to a UE, a first allocation, for reception of a downlink communication via a first cell associated with the base station, that overlaps with a second allocation for reception of a SSB for a second cell. The transmission component 1504 may transmit the downlink communication during non-overlapping resources.

The reception component 1502 may receive, from a UE, an indication of a capability to receive one or more SSBs, from one or more non-serving cells, on resources that overlap with a downlink communication from a serving cell. The transmission component 1504 may transmit, based at least in part on the indication, a first allocation for reception of the downlink communication from the serving cell that overlaps with a second allocation for reception of an SSB for a non-serving cell.

The transmission component 1504 may transmit the downlink communication via a first set of resources of the first allocation.

The transmission component 1504 may transmit the downlink communication via a first set of resources of the first allocation.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a first allocation, for reception of a downlink communication via a first cell, that is configured to be spaced by an amount of time from a second allocation for reception of a synchronization signal block (SSB) for a second cell; and receiving the downlink communication using resources of the first allocation and receiving the SSB using resources of the second allocation.

Aspect 2: The method of Aspect 1, wherein the amount of time is based at least in part on a communication protocol or configuration information.

Aspect 3: The method of any of Aspects 1-2, wherein the amount of time is based at least in part on a subcarrier spacing of the downlink communication.

Aspect 4: The method of any of Aspects 1-3, wherein the second allocation for reception of the SSB is associated with a guard window, during which a base station of the first cell is configured not to transmit the downlink communication, that extends for a first number of symbols before a scheduled transmission of the SSB and for a second number of symbols after the scheduled transmission of the SSB.

Aspect 5: The method of Aspect 4, wherein one or more of the first number of symbols or the second number of symbols is based at least in part on a difference in reception timings, at the UE, associated with the first cell and the second cell.

Aspect 6: The method of Aspect 5, wherein the difference in the reception timings at the UE is unknown before reception of the SSB.

Aspect 7: A method of wireless communication performed by a user equipment (UE), comprising: receiving a first allocation, for reception of a downlink communication via a first cell, that overlaps with a second allocation for reception of a synchronization signal block (SSB) for a second cell; and receiving the downlink communication during non-overlapping resources and receiving the SSB during overlapping resources.

Aspect 8: The method of Aspect 7, wherein the first allocation overlaps with the second allocation and a guard window that extends for a first number of symbols before a scheduled transmission of the SSB and for a second number of symbols after the scheduled transmission of the SSB, and wherein receiving the downlink communication during the non-overlapping resources comprises receiving the downlink communication during the non-overlapping resources that are outside of the guard window.

Aspect 9: The method of Aspect 8, wherein one or more of the first number of symbols or the second number of symbols is based at least in part on a difference in reception timings, at the UE, associated with the first cell and the second cell.

Aspect 10: The method of Aspect 9, wherein the difference in the reception timings at the UE is unknown before reception of the SSB.

Aspect 11: The method of any of Aspects 8-10, wherein one or more of the first number of symbols or the second number of symbols is based at least in part on a subcarrier spacing associated with the first cell.

Aspect 12: The method of any of Aspects 7-11, wherein receiving the SSB during the overlapping resources comprises: receiving the SSB during the overlapping resources within an SSB measurement timing configuration window, or receiving the SSB during the overlapping resources outside of the SSB measurement timing configuration window.

Aspect 13: The method of any of Aspects 7-12, wherein receiving the downlink communication during the non-overlapping resources comprises: receiving the downlink communication during the non-overlapping resources based at least in part on rate matching the non-overlapping resources.

Aspect 14: A method of wireless communication performed by a user equipment (UE), comprising: transmitting an indication of a capability to receive one or more SSBs, from one or more non-serving cells, on resources that overlap with a downlink communication from a serving cell; and receiving, based at least in part on the indication, a first allocation for reception of the downlink communication from the serving cell that overlaps with a second allocation for reception of an SSB for a non-serving cell.

Aspect 15: The method of Aspect 14, further comprising: receiving the downlink communication via a first set of resources of the first allocation; and receiving the SSB via a second set of resources, that overlap with at least a portion of the first set of resources, of the first allocation.

Aspect 16: The method of any of Aspects 14-15, further comprising: receiving the downlink communication via a first set of resources of the first allocation; and receiving the SSB and an additional SSB via a second set of resources, that are overlapping with the first set of resources, of the first allocation.

Aspect 17: The method of Aspect 16, wherein receiving the downlink communication via the first set of resources of the first allocation comprises: receiving the downlink communication during the first set of resources based at least in part on rate matching the first set of resources.

Aspect 18: The method of any of Aspects 16-17, wherein the first allocation comprises: the first set of resources, the second set of resources, and a guard window that extends for a first number of symbols before a scheduled transmission of an earlier of the SSB and the additional SSB, and for a second number of symbols after a scheduled transmission of a later of the SSB and the additional SSB, wherein the first set of resources are outside of the guard window.

Aspect 19: The method of Aspect 18, wherein one or more of the first number of symbols or the second number of symbols is based at least in part on a difference in reception timings, at the UE, associated with the serving cell and the non-serving cell.

Aspect 20: The method of Aspect 19, wherein the difference in the reception timings at the UE is unknown before reception of the SSB.

Aspect 21: The method of any of Aspects 18-19, wherein one or more of the first number of symbols or the second number of symbols is based at least in part on a subcarrier spacing associated with the serving cell.

Aspect 22: The method of any of Aspects 14-21, wherein receiving the SSB comprises: receiving the SSB within an SSB measurement timing configuration window, or receiving the SSB outside of the SSB measurement timing configuration window.

Aspect 23: The method of any of Aspects 14-22, wherein the capability to receive the one or more SSBs on resources that overlap with the downlink communication from the serving cell is based at least in part on one or more of: components of the UE, power resources of the UE, or channel conditions of the UE.

Aspect 24: The method of any of Aspects 14-23, wherein transmitting the indication of the capability to receive the one or more SSBs on resources that overlap with the downlink communication from the serving cell comprises: transmitting the indication via radio resource control signaling, or transmitting the indication via dynamic signaling.

Aspect 25: The method of Aspect 14, wherein the indication of the capability to receive the one or more SSBs on resources that overlap with the downlink communication from the serving cell comprises: an indication of a number of SSBs having different physical cell identifications (PCIs) that the UE is capable of receiving simultaneously on resources that overlap with the downlink communication from the serving cell.

Aspect 26: The method of Aspect 25, wherein the indication of the number of SSBs having different PCIs that the UE is capable to receive simultaneously on resources that overlap with the downlink communication from the serving cell comprises one or more indications of: a number of SSBs, that the UE is capable to receive, having different PCIs and having reception timing differences that are less than a cyclic prefix associated with the serving cell, a number of SSBs, that the UE is capable to receive, having different PCIs and having reception timing differences that are greater than a cyclic prefix associated with the serving cell, or a number of SSBs, that the UE is capable to receive, having different PCIs and having reception timing differences from a serving cell SSB that are less than a reception timing difference threshold.

Aspect 27: A method of wireless communication performed by a base station, comprising: transmitting, to a user equipment (UE), a first allocation, for reception of a downlink communication via a first cell associated with the base station, that is configured to be spaced by an amount of time from a second allocation for reception of a synchronization signal block (SSB) for a second cell; and transmitting the downlink communication using resources of the first allocation and transmitting the SSB using resources of the second allocation.

Aspect 28: The method of Aspect 27, wherein the amount of time is based at least in part on a communication protocol or configuration information.

Aspect 29: The method of any of Aspects 27-28, wherein the amount of time is based at least in part on a subcarrier spacing of the downlink communication.

Aspect 30: The method of any of Aspects 27-29, wherein the second allocation for reception of the SSB is associated with a guard window, during which the base station is configured not to transmit the downlink communication, that extends for a first number of symbols before a scheduled transmission of the SSB and for a second number of symbols after the scheduled transmission of the SSB.

Aspect 31: The method of Aspect 30, wherein one or more of the first number of symbols or the second number of symbols is based at least in part on a difference in reception timings, at the UE, associated with the first cell and the second cell.

Aspect 32: The method of Aspect 31, wherein the difference in the reception timings at the UE is unknown before reception of the SSB.

Aspect 33: A method of wireless communication performed by a base station, comprising: transmitting, to a user equipment (UE), a first allocation, for reception of a downlink communication via a first cell associated with the base station, that overlaps with a second allocation for reception of a synchronization signal block (SSB) for a second cell; and transmitting the downlink communication during non-overlapping resources.

Aspect 34: The method of Aspect 33, wherein the first allocation overlaps with the second allocation and a guard window that extends for a first number of symbols before a scheduled transmission of the SSB and for a second number of symbols after the scheduled transmission of the SSB, and wherein transmitting the downlink communication during the non-overlapping resources comprises transmitting the downlink communication during the non-overlapping resources that are outside of the guard window.

Aspect 35: The method of Aspect 34, wherein one or more of the first number of symbols or the second number of symbols is based at least in part on a difference in reception timings, at the UE, associated with the first cell and the second cell.

Aspect 36: The method of Aspect 35, wherein the difference in the reception timings at the UE is unknown before reception of the SSB.

Aspect 37: The method of any of Aspects 34-36, wherein one or more of the first number of symbols or the second number of symbols is based at least in part on a subcarrier spacing associated with the first cell.

Aspect 38: The method of any of Aspects 33-37, wherein transmitting the downlink communication during the non-overlapping resources comprises: receiving the downlink communication during the non-overlapping resources based at least in part on rate matching the non-overlapping resources.

Aspect 39: A method of wireless communication performed by a base station, comprising: receiving, from a user equipment (UE), an indication of a capability to receive one or more SSBs, from one or more non-serving cells, on resources that overlap with a downlink communication from a serving cell; and transmitting, based at least in part on the indication, a first allocation for reception of the downlink communication from the serving cell that overlaps with a second allocation for reception of an SSB for a non-serving cell.

Aspect 40: The method of Aspect 39, further comprising: transmitting the downlink communication via a first set of resources of the first allocation.

Aspect 41: The method of any of Aspects 39-40, further comprising: transmitting the downlink communication via a first set of resources of the first allocation.

Aspect 42: The method of Aspect 41, wherein transmitting the downlink communication via the first set of resources of the first allocation comprises: transmitting the downlink communication during the first set of resources based at least in part on rate matching the first set of resources.

Aspect 43: The method of any of Aspects 41-42, wherein the first allocation comprises: the first set of resources, a second set of resources of the second allocation, and a guard window that extends for a first number of symbols before a scheduled transmission of an earlier of the SSB and an additional SSB, and for a second number of symbols after a scheduled transmission of a later of the SSB and the additional SSB, wherein the first set of resources are outside of the guard window.

Aspect 44: The method of Aspect 43, wherein one or more of the first number of symbols or the second number of symbols is based at least in part on a difference in reception timings, at the UE, associated with the downlink communication and one or more of the SSB or the additional SSB.

Aspect 45: The method of Aspect 44, wherein the difference in the reception timings at the UE is unknown before reception of one or more of the SSB or the additional SSB.

Aspect 46: The method of any of Aspects 43-44, wherein one or more of the first number of symbols or the second number of symbols is based at least in part on a subcarrier spacing associated with the serving cell.

Aspect 47: The method of any of Aspects 39-46, wherein the capability to receive the one or more SSBs on resources that overlap with the downlink communication from the serving cell is based at least in part on one or more of: components of the UE, power resources of the UE, or channel conditions of the UE.

Aspect 48: The method of any of Aspects 39-47, wherein receiving the indication of the capability to receive the one or more SSBs on resources that overlap with the downlink communication from the serving cell comprises: receiving the indication via radio resource control signaling, or receiving the indication via dynamic signaling.

Aspect 49: The method of any of Aspects 39-48, wherein the indication of the capability to receive the one or more SSBs on resources that overlap with the downlink communication from the serving cell comprises: an indication of a number of SSBs having different physical cell identifications (PCIs) that the UE is capable of receiving simultaneously on resources that overlap with the downlink communication from the serving cell.

Aspect 50: The method of Aspect 49, wherein the indication of the number of SSBs having different PCIs that the UE is capable to receive simultaneously on resources that overlap with the downlink communication from the serving cell comprises one or more indications of: a number of SSBs, that the UE is capable to receive, having different PCIs and having reception timing differences that are less than a cyclic prefix associated with the serving cell, a number of SSBs, that the UE is capable to receive, having different PCIs and having reception timing differences that are greater than a cyclic prefix associated with the serving cell, or a number of SSBs, that the UE is capable to receive, having different PCIs and having reception timing differences from a serving cell SSB that are less than a reception timing difference threshold.

Aspect 51: An apparatus for wireless communication at a device, comprising a processor; memory coupled with the processor; and instructions stored in the memory and executable by the processor to cause the apparatus to perform the method of one or more of Aspects 1-50.

Aspect 52: A device for wireless communication, comprising a memory and one or more processors coupled to the memory, the one or more processors configured to perform the method of one or more of Aspects 1-50.

Aspect 53: An apparatus for wireless communication, comprising at least one means for performing the method of one or more of Aspects 1-50.

Aspect 54: A non-transitory computer-readable medium storing code for wireless communication, the code comprising instructions executable by a processor to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A user equipment (UE) for wireless communication, comprising:

one or more memories; and one or more processors, coupled to the one or more memories, configured to:

transmit, to a serving cell, an indication of a capability to receive one or more of synchronization signal blocks (SSBs), from one or more non-serving cells, on resources that overlap with communications from the serving cell;

receive a first allocation, for reception of a downlink communication via the serving cell, that is configured to be spaced by an amount of time from a second allocation for reception of an SSB for a non-serving cell; and receive the downlink communication using resources of the first allocation and receive the SSB using resources of the second allocation.

2. The UE of claim 1, wherein the amount of time is based at least in part on a communication protocol or configuration information.

3. The UE of claim 1, wherein the amount of time is based at least in part on a subcarrier spacing of the downlink communication.

4. The UE of claim 1, wherein the second allocation for reception of the SSB is associated with a guard window, during which a base station of the serving cell is configured not to transmit the downlink communication, that extends for a first number of symbols before a scheduled transmission of the SSB and for a second number of symbols after the scheduled transmission of the SSB.

5. The UE of claim 4, wherein one or more of the first number of symbols or the second number of symbols is based at least in part on a difference in reception timings, at the UE, associated with the serving cell and the non-serving cell.

6. The UE of claim 5, wherein the difference in the reception timings at the UE is unknown before reception of the SSB.

7. A user equipment (UE) for wireless communication, comprising:

one or more memories; and one or more processors, coupled to the one or more memories, configured to:

transmit, to a serving cell, an indication of a capability to receive one or more of synchronization signal blocks (SSBs), from one or more non-serving cells, on resources that overlap with communications from the serving cell;

receive a first allocation, for reception of a downlink communication via the serving cell, that overlaps with a second allocation for reception of an SSB for a non-serving cell; and receive the downlink communication during non-overlapping resources and receive the SSB during overlapping resources.

8. The UE of claim 7, wherein the first allocation overlaps with the second allocation and a guard window that extends for a first number of symbols before a scheduled transmission of the SSB and for a second number of symbols after the scheduled transmission of the SSB, and wherein the one or more processors, to receive the downlink communication during the non-overlapping resources, are configured to receive the downlink communication during the non-overlapping resources that are outside of the guard window.

9. The UE of claim 8, wherein one or more of the first number of symbols or the second number of symbols is based at least in part on a difference in reception timings, at the UE, associated with the serving cell and the non-serving cell.

10. The UE of claim 9, wherein the difference in the reception timings at the UE is unknown before reception of the SSB.

11. The UE of claim 8, wherein one or more of the first number of symbols or the second number of symbols is based at least in part on a subcarrier spacing associated with the serving cell.

12. The UE of claim 7, wherein the one or more processors, to receive the SSB during the overlapping resources, are configured to:

receive the SSB during the overlapping resources within an SSB measurement timing configuration window, or receive the SSB during the overlapping resources outside of the SSB measurement timing configuration window.

13. The UE of claim 7, wherein the one or more processors, to receive the downlink communication during the non-overlapping resources, are configured to:

receive the downlink communication during the non-overlapping resources based at least in part on rate matching the non-overlapping resources.

14. A user equipment (UE) for wireless communication, comprising:

one or more memories; and one or more processors, coupled to the one or more memories, configured to:

transmit, to a serving cell, an indication of a capability to receive one or more of synchronization signal blocks (SSBs), from one or more non-serving cells, on resources that overlap with a downlink communication from the serving cell; and receive, based at least in part on the indication, a first allocation for reception of the downlink communication from the serving cell that overlaps with a second allocation for reception of an SSB for a non-serving cell.

15. The UE of claim 14, wherein the one or more processors are further configured to:

receive the downlink communication via a first set of resources of the first allocation; and receive the SSB via a second set of resources, that overlap with at least a portion of the first set of resources, of the first allocation.

16. The UE of claim 14, wherein the one or more processors are further configured to:

receive the downlink communication via a first set of resources of the first allocation; and receive the SSB and an additional SSB via a second set of resources, that are overlapping with the first set of resources, of the first allocation.

17. The UE of claim 16, wherein the one or more processors, to receive the downlink communication via the first set of resources of the first allocation, are configured to:

receive the downlink communication during the first set of resources based at least in part on rate matching the first set of resources.

18. The UE of claim 16, wherein the first allocation comprises:

the first set of resources, the second set of resources, and a guard window that extends for a first number of symbols before a scheduled transmission of an earlier of the SSB and the additional SSB, and for a second number of symbols after a scheduled transmission of a later of the SSB and the additional SSB, wherein the first set of resources are outside of the guard window.

19. The UE of claim 18, wherein one or more of the first number of symbols or the second number of symbols is based at least in part on a difference in reception timings, at the UE, associated with the serving cell and the non-serving cell.

20. The UE of claim 19 wherein the difference in the reception timings at the UE is unknown before reception of the SSB.

21. The UE of claim 18, wherein one or more of the first number of symbols or the second number of symbols is based at least in part on a subcarrier spacing associated with the serving cell.

22. The UE of claim 14, wherein the one or more processors, to receive the SSB, are configured to:

receive the SSB within an SSB measurement timing configuration window, or receive the SSB outside of the SSB measurement timing configuration window.

23. The UE of claim 14, wherein the capability to receive the one or more SSBs on resources that overlap with the downlink communication from the serving cell is based at least in part on one or more of:

components of the UE, power resources of the UE, or channel conditions of the UE.

24. The UE of claim 14, wherein the one or more processors, to transmit the indication of the capability to receive the one or more SSBs on resources that overlap with the downlink communication from the serving cell, are configured to:

transmit the indication via radio resource control signaling, or transmit the indication via dynamic signaling.

25. The UE of claim 14, wherein the indication of the capability to receive the one or more SSBs on resources that overlap with the downlink communication from the serving cell comprises:

an indication of a number of SSBs having different physical cell identifications (PCIs) that the UE is capable of receiving simultaneously on resources that overlap with the downlink communication from the serving cell.

26. The UE of claim 25, wherein the indication of the number of SSBs having different PCIs that the UE is capable to receive simultaneously on resources that overlap with the downlink communication from the serving cell comprises one or more indications of:

a number of SSBs, that the UE is capable to receive, having different PCIs and having reception timing differences that are less than a cyclic prefix associated with the serving cell, a number of SSBs, that the UE is capable to receive, having different PCIs and having reception timing differences that are greater than a cyclic prefix associated with the serving cell, or a number of SSBs, that the UE is capable to receive, having different PCIs and having reception timing differences from a serving cell SSB that are less than a reception timing difference threshold.

27. A method of wireless communication performed by a user equipment (UE), comprising:

transmitting, to a serving cell, an indication of a capability to receive one or more of synchronization signal blocks (SSBs), from one or more non-serving cells, on resources that overlap with communications from the serving cell;

receiving a first allocation, for reception of a downlink communication via the serving cell, that overlaps with a second allocation for reception of an SSB for a non-serving cell; and receiving the downlink communication during non-overlapping resources and receiving the SSB during overlapping resources.

28. The method of claim 27, wherein the first allocation overlaps with the second allocation and a guard window that extends for a first number of symbols before a scheduled transmission of the SSB and for a second number of symbols after the scheduled transmission of the SSB, and wherein receiving the downlink communication during the non-overlapping resources comprises receiving the downlink communication during the non-overlapping resources that are outside of the guard window.

29. The method of claim 27, wherein receiving the SSB during the overlapping resources comprises:

receiving the SSB during the overlapping resources within an SSB measurement timing configuration window, or receiving the SSB during the overlapping resources outside of the SSB measurement timing configuration window.

30. The method of claim 27, wherein receiving the downlink communication during the non-overlapping resources comprises:

receiving the downlink communication during the non-overlapping resources based at least in part on rate matching the non-overlapping resources.

* * * * *